United States Patent
Ichinomiya et al.

(10) Patent No.: US 9,959,985 B2
(45) Date of Patent: *May 1, 2018

(54) AQUEOUS LIQUID COMPOSITION, AQUEOUS COATING LIQUID, FUNCTIONAL COATING FILM AND COMPOSITE MATERIAL

(75) Inventors: Yosuke Ichinomiya, Tokyo (JP); Kozaburo Hayashi, Tokyo (JP); Yoshihiko Iijima, Tokyo (JP); Nobuyuki Kobayashi, Tokyo (JP)

(73) Assignee: DAINICHISEIKA COLOR & CHEMICALS MFG. CO., LTD., Tokyo (JP)

(*) Notice: Subject to any disclaimer, the term of this patent is extended or adjusted under 35 U.S.C. 154(b) by 124 days.

This patent is subject to a terminal disclaimer.

(21) Appl. No.: 14/418,784

(22) PCT Filed: Aug. 21, 2012

(86) PCT No.: PCT/JP2012/071059
§ 371 (c)(1),
(2), (4) Date: Jan. 30, 2015

(87) PCT Pub. No.: WO2014/030208
PCT Pub. Date: Feb. 27, 2014

(65) Prior Publication Data
US 2015/0179357 A1  Jun. 25, 2015

(51) Int. Cl.
*H01G 11/60* (2013.01)
*C09D 5/02* (2006.01)
(Continued)

(52) U.S. Cl.
CPC .......... *H01G 11/60* (2013.01); *C08K 5/5317* (2013.01); *C09D 5/02* (2013.01); *C09D 7/1233* (2013.01);
(Continued)

(58) Field of Classification Search
CPC ........ H01G 11/60; H01G 9/042; H01G 11/26; H01G 11/30; C08L 1/02; C08L 3/02;
(Continued)

(56) References Cited

U.S. PATENT DOCUMENTS 4,824,886 A  4/1989  Schmidt et al.
6,162,391 A  12/2000  Kowata et al.
(Continued)

FOREIGN PATENT DOCUMENTS

CN  1781971  6/2006
CN  101698542  4/2010
(Continued)

OTHER PUBLICATIONS

Fujiyama: "New Mixing and Dispersion Technology for Conductive Fillers and Measures for Mixing and Dispersion Failures" Chapter I, Causes of Mixing and Dispersion Failures for Conductive Fillers; Technical Information Institute Co., Ltd., (2004), with English abstract (18 pages).
(Continued)

Primary Examiner — Ula C Ruddock
Assistant Examiner — Thomas H. Parsons
(74) Attorney, Agent, or Firm — Hamre, Schumann, Mueller & Larson, P.C.

(57) ABSTRACT

Provided is an aqueous liquid composition including a water-based medium containing water, a polymer having at least one type of groups selected from hydroxyl groups and amino groups, and phosphonobutanetricarboxylic acid. The polymer is at least one polymer selected from the group consisting of a polysaccharide, polyamino acid, polyvinyl alcohol, polyallylamine, polyvinylamine, a polyamidine, a polyethylenimine, and their derivatives.

28 Claims, 1 Drawing Sheet

(51) Int. Cl.
| | |
|---|---|
| *C09D 129/04* | (2006.01) |
| *C09D 101/02* | (2006.01) |
| *C09D 103/02* | (2006.01) |
| *C09D 105/04* | (2006.01) |
| *C09D 105/06* | (2006.01) |
| *C09D 105/08* | (2006.01) |
| *H01M 4/66* | (2006.01) |
| *C09D 177/04* | (2006.01) |
| *C09D 179/02* | (2006.01) |
| *H01G 9/042* | (2006.01) |
| *H01G 11/30* | (2013.01) |
| *C09D 7/12* | (2006.01) |
| *C08K 5/5317* | (2006.01) |
| *C09D 101/28* | (2006.01) |
| *C09D 103/08* | (2006.01) |
| *C09D 133/02* | (2006.01) |
| *C09D 139/02* | (2006.01) |
| *C09D 189/00* | (2006.01) |
| *H01B 1/20* | (2006.01) |
| *H01G 11/26* | (2013.01) |
| *H01M 4/62* | (2006.01) |
| *C09D 201/02* | (2006.01) |
| *C09D 201/06* | (2006.01) |
| *H01M 10/052* | (2010.01) |

(52) U.S. Cl.
CPC ........ *C09D 101/02* (2013.01); *C09D 101/284* (2013.01); *C09D 103/02* (2013.01); *C09D 103/08* (2013.01); *C09D 105/04* (2013.01); *C09D 105/06* (2013.01); *C09D 105/08* (2013.01); *C09D 129/04* (2013.01); *C09D 133/02* (2013.01); *C09D 139/02* (2013.01); *C09D 177/04* (2013.01); *C09D 179/02* (2013.01); *C09D 189/00* (2013.01); *C09D 201/025* (2013.01); *C09D 201/06* (2013.01); *H01B 1/20* (2013.01); *H01G 9/042* (2013.01); *H01G 11/26* (2013.01); *H01G 11/30* (2013.01); *H01M 4/622* (2013.01); *H01M 4/667* (2013.01); *H01M 4/668* (2013.01); *H01M 10/052* (2013.01); *Y02E 60/13* (2013.01); *Y10T 428/31623* (2015.04); *Y10T 428/31634* (2015.04); *Y10T 428/31645* (2015.04); *Y10T 428/31678* (2015.04); *Y10T 428/31681* (2015.04); *Y10T 428/31685* (2015.04); *Y10T 428/31692* (2015.04); *Y10T 428/31703* (2015.04)

(58) Field of Classification Search
CPC ...... C08L 5/04; C08L 5/06; C08L 5/08; C08L 77/04; C08L 79/02; C09D 7/1233; C09D 101/02; C09D 101/08; C09D 103/02; C09D 103/08; C09D 105/04; C09D 105/06; C09D 105/08; C09D 129/04; C09D 133/04; H01M 4/622; H01M 4/667; H01M 4/668
See application file for complete search history.

(56) References Cited

U.S. PATENT DOCUMENTS

| | | |
|---|---|---|
| 2003/0143420 A1 | 7/2003 | Wojcik |
| 2006/0112647 A1 | 6/2006 | Fujii et al. |
| 2006/0214137 A1 | 9/2006 | Schlosser |
| 2008/0280538 A1 | 11/2008 | Fujii et al. |
| 2010/0273052 A1 | 10/2010 | Sakitani et al. |
| 2011/0091771 A1 | 4/2011 | Sannan et al. |
| 2012/0022192 A1 | 1/2012 | Nishida |
| 2012/0077903 A1* | 3/2012 | Yamagami ............ C08G 59/66 523/400 |
| 2012/0156562 A1 | 6/2012 | Kobayashi et al. |
| 2013/0034743 A1 | 2/2013 | Bannai et al. |
| 2013/0157129 A1 | 6/2013 | Uemura et al. |
| 2013/0316231 A1 | 11/2013 | Iijima et al. |

FOREIGN PATENT DOCUMENTS

| | | |
|---|---|---|
| EP | 2537674 | 12/2012 |
| JP | 63-010456 | 1/1988 |
| JP | 02-031894 | 2/1990 |
| JP | 3-285262 | 12/1991 |
| JP | 63091292 * | 4/1998 |
| JP | 10-323696 | 12/1998 |
| JP | 3112015 | 11/2000 |
| JP | 2003-206409 | 7/2003 |
| JP | 2003206409 * | 7/2003 |
| JP | 2009-238720 | 10/2009 |
| JP | 2010185024 * | 8/2010 |
| JP | 2011-086636 | 4/2011 |
| JP | 2011086636 * | 4/2011 |
| JP | 2011-161876 | 8/2011 |
| JP | 5134739 B | 1/2013 |
| KR | 10-2011-0015038 | 2/2011 |
| TW | 201128667 | 8/2011 |
| WO | WO 2009/147989 | 12/2009 |
| WO | 2010/082491 | 7/2010 |
| WO | WO 2010/092875 | 8/2010 |
| WO | 2012/029858 | 3/2012 |
| WO | WO 2012/114834 | 8/2012 |

OTHER PUBLICATIONS

Tachibana: "Preparation, Coating and Drying of Positive Electrodes Slurry for Lithium Ion Secondary Cells, and Understanding of Electrode Operations"; Material Stage, Technical Information Institute Co., Ltd., 8(12), (2009), pp. 72-75 with English abstract.
Jou: "Technological Development of Dispersing Agents for Water Borne Coating Materials"; JETI, 44(10), (1996), pp. 110-112 with English abstract.
Kamiya: "Evaluation and Control of Agglomeration/Dispersion Behavior of Microparticles in Water System", Material Stage, 2(1), (2002), pp. 54-60 with English abstract.
Extended European Search Report, issued in the corresponding European patent application No. 12883345.6-1302, dated May 10, 2016, 5 pages.
Japanese Office Action, dated Jul. 28, 2015; Japanese Patent Application No. 2014-531406 (4 pages).
Taiwanese Office Action, dated Apr. 17, 2015; Taiwanese Patent Application No. 101130477 (7 pages).
Korean Office Action, issued in the corresponding Korean patent application No. 10-2013-7024459, dated Oct. 15, 2014.
Chinese Office Action, issued in the corresponding Chinese patent application No. 201280010248.5, dated Feb. 13, 2015.
Supplementary Partial European Search Report, issued in the corresponding European patent application No. 12749973.9, dated May 26, 2015.
Supplementary Extended European Search Report, issued in the corresponding European patent application No. 12749973.9, dated Jul. 8, 2015.
International Search Report, issued in the corresponding International patent application No. PCT/JP2012/052128, dated May 1, 2012.

* cited by examiner

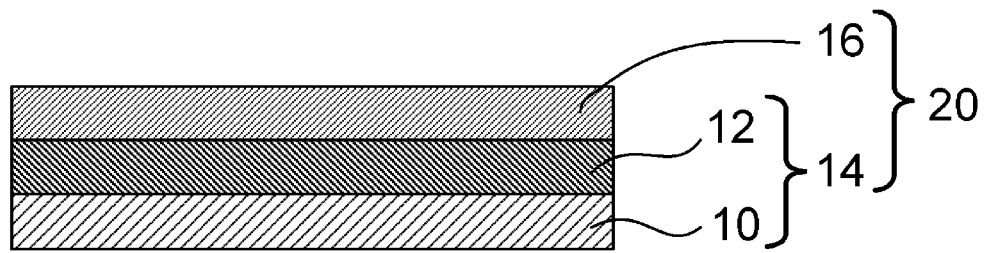

AQUEOUS LIQUID COMPOSITION, AQUEOUS COATING LIQUID, FUNCTIONAL COATING FILM AND COMPOSITE MATERIAL

TECHNICAL FIELD

This invention relates to an aqueous liquid composition having low environmental load. More specifically, the present invention is concerned with an aqueous liquid composition and aqueous coating formulation, which can form functional coating films useful in various industrial fields, and also with a functional coating film formed with the aqueous coating formulation, a composite material with the functional coating film and a base material integrated together, and the like.

BACKGROUND ART

In recent years, attempts have been made to use various functions of coating films formed by providing liquid compositions—such as solutions, slurries or pastes, which are equipped with various functions, respectively, and may hereinafter also be collectively referred to as "slurries"—as functional coating formulations and applying the functional coating formulations. Such attempts are under way in various fields such as paints, inks, coating agents, magnetic materials, ceramics, building materials, adhesives, liquid crystal color filters, pharmaceuticals, electronic materials, and electricity storage devices.

For example, a paste-form, conductive coating formulation composed of a conductive material, binder resin, curing agent, solvent and the like is used as a conductive adhesive, conductive paint, conductive ink or the like (Non-patent Document 1). A coated, magnetic recording medium such as an audio tape, video tape or flexible disk is manufactured by applying, onto a base film of a polyester or the like, a magnetic coating formulation with magnetic particles of submicron size evenly dispersed in a polymer solution. Further, electrodes for a lithium ion secondary cell are each prepared by mixing an active material, conductive material and binder to prepare a slurry, coating the slurry onto a collector, and then drying it (Non-patent Document 2).

To allow each of such various functional coating formulations as described above to fully exhibit its functionality, the coating film to be formed is required to be equipped with durability and high adhesiveness to a base material. In other words, it is essential conditions that the coating formulation is in a state appropriate for the exhibition of the functionality and can form a coating film having high adhesiveness to the base material and durability. As solvents (dispersion media) for such coating formulations, nonaqueous (organic solvent-based) solvents, which exhibit high compatibility with base materials and can be readily dried, are overwhelmingly advantageous, and as a matter of fact, have been used widely.

However, organic solvents are generally high in volatility. Accordingly, they are not only high in environmental load but also required to take genotoxicity into consideration, and therefore, still involve problems in safety and workability. In recent years, there is an increasing concern about the protection of environment and the prevention of health hazards in many industrial fields. There is, hence, an increasing demand toward VOC reductions, solventless coating and the like in connection with the use of organic solvents involving such problems as described above, leading to an outstanding requirement to switch to products that are friendly to the environment and people.

As products friendly to the environment and people, water-based products or products made from raw materials of biological origin are drawing attention. These products are expected to become part of solventless or post-petroleum products. Various problems, however, arise if water is used as a solvent in place of an organic solvent. For example, a water-based coating formulation involves a problem in that it is inferior in film-forming ability to an organic solvent-based coating formulation. Further, a slurry-form, water-based coating formulation with a filler contained therein is accompanied by a problem in that the filler tends to agglomerate in the slurry when it is in a charged state, and moreover, the filler is prone to settling due to a large difference in specific gravity between the solvent and the filler, thereby raising another problem in that its even dispersion is difficult. In addition, it is not easy to find raw materials of biological origin, which exhibit film-forming ability and dispersing ability and can replace conventional raw materials of petroleum origin.

Upon attempting the dispersion and stabilization of a filler in a water-based slurry, various methods may be contemplated including the use of a dispersant, the surface treatment, microencapsulation and ultrasonic treatment of the filler, and the introduction of polar groups into a polymer. Among these methods, the use of the dispersant is advantageous when the simplification of the production method and coating system and the cost matter are taken into account. As the dispersant for use in the water-based slurry, a polycarboxylate salt or phosphate amine salt used in the field of paints (Non-patent Document 3), a polyacrylamide as a high-molecular dispersant (Non-patent Document 4), or the like is conceivable. When a reduction in environmental load is taken into consideration, however, the dispersant may preferably be a substance of natural origin, which is friendly to the environment. A proposal has been made about the use of carboxymethylcellulose as a water-based dispersant upon production of each electrode for a nonaqueous electrolyte secondary cell (Patent Document 1). Concerning carboxymethylcellulose, however, there is still a room for an improvement in its dispersing effect. On the other hand, the use of a petroleum-based binder resin is needed to form a strong coating film. There is, accordingly, an outstanding desire for a utilization technology of a natural polymer that, although it is a substance of biological origin, can exhibit adhesiveness which is by no means inferior to that available from the use of a petroleum-based binder resin.

As an expected application of the water-based slurry, a coating formulation for electrode plates in electricity storage devices such as secondary cells or capacitors is considered. The demand for these electricity storage devices has been significantly growing in recent years. Each electrode plate is a member that includes unit members such as an electrode layer (active material layer) and collector integrated therein and gives significant effects on the performance of an electricity storage device. Proposals have been made to permit the production of an electrode plate in the form of a thinner film with larger area such that an electricity storage device can be provided with an extended charge-discharge cycle life and an increased energy density. For example, Patent Document 2 discloses a positive electrode plate, which is obtained by dispersing or dissolving a powder of a positive-electrode active material such as a metal oxide, sulfide or halogenide, a conductive material and a binder in an appropriate solvent to prepare a paste-form coating formulation, and then applying the coating formulation onto a surface of a collector formed of a foil of a metal such as aluminum to form an active material layer.

A negative electrode plate for a cell or a polarizable electrode plate for a capacitor is obtained by mixing an active material such as a carbonaceous material with a solution of a binder in a suitable solvent to obtain a paste-form coating formulation and then applying the coating formulation onto a collector to form a coating film layer. The binder employed to prepare the coating formulation is required inter alia to be electrochemically stable to a non-aqueous electrolyte and to be free from dissolution into the electrolyte for the cell or capacitor, to remain free from substantial swelling by the electrolyte, and further to be soluble in a certain solvent.

On the other hand, it is practiced to form a protective film on a surface of a metal material such as aluminum, as a base metal material of a collector, by coating a solution of one of various resins. The resulting protective film is excellent in the adhesiveness to the metal surface, but is accompanied by a problem in that its durability to an organic solvent is insufficient.

The coating film layer (undercoat layer) of the electrode plate for the cell or capacitor, said coating film layer having been obtained by applying the above-described paste-form coating formulation onto a collector, is accompanied by problems in that its adhesiveness to the collector and its flexibility are insufficient. In addition, such an undercoat layer has a high contact resistance to the collector, and may undergo delamination, flaking, cracking and/or the like upon assembly of the cell or capacitor or upon charging and discharging the same.

As described above, the conventional cell or capacitor is accompanied by the problems of the poor adhesion between the electrode layer and the collector (substrate) and the high resistance between the active material layer and the collector. A variety of coating formulations have been proposed to solve these problems. By undercoat layers formed with the various coating formulations so proposed, the problem of poor adhesiveness has been increasingly lessened. However, still higher resistance is produced between the active material layer and the collector, so that none of these coating formulations have led to a solution to the problems yet. In recent years, there is also a demand for a manufacturing method, which has paid due consideration to the environment, for the above-mentioned electricity storage devices and their related products. There is hence a demand for a coating formulation making use of components, which are low in environmental load.

PRIOR ART DOCUMENTS

Patent Documents

Patent Document 1: JP-A-2009-238720
Patent Document 2: JP-A-3-285262

Non-Patent Documents

Non-patent Document 1: FUJIYAMA, Mitsuyoshi: "Chapter I, Causes of Mixing and Dispersion Failures for Conductive Fillers", "New Mixing and Dispersion Technology for Conductive Fillers and Measures for Mixing and Dispersion Failures" in Japanese, Technical Information Institute Co., Ltd. p. 20 (2004)
Non-patent Document 2: TACHIBANA, Kazuhiro: "Preparation, Coating and Drying of Positive Electrode Slurry for Lithium Ion Secondary Cells, and Understanding of Electrode Operations" in Japanese, Material Stage, Technical Information Institute Co., Ltd., 8(12), pp. 72-75 (2009)
Non-patent Document 3: JOU, Kiyokazu: "Technological Development of Dispersing Agents for Water Borne Coating Materials" in Japanese, JETI, 44(10), pp. 110-112 (1996) Non-patent Document 4: KAMIYA, Hidehiro: "Evaluation and Control of Agglomeration/Dispersion Behavior of Microparticles in Water System" in Japanese, Material Stage, 2(1), pp. 54-60 (2002)

DISCLOSURE OF THE INVENTION

Problem to be Solved by the Invention

Objects of the present invention are to provide an aqueous liquid composition, which contains low-cost materials having low environmental load, can retain adequate viscosity even when stored over a long term, and can form a functional coating film having excellent adhesiveness to a base material and superb durability, solvent resistance and waterproofness and capable of exhibiting various functions led by electrical conductivity and hydrophilicity, and also an aqueous coating formulation.

Further objects of the present invention are to provide a functional coating film having excellent adhesiveness to a base material and superb durability, solvent resistance and waterproofness and capable of exhibiting various functions led by electrical conductivity and hydrophilicity, and also a method for forming the functional coating film.

A still further object of the present invention is to provide a composite material with a functional coating film, which has superb durability, solvent resistance and waterproofness and is capable of exhibiting various functions led by electrical conductivity and hydrophilicity, adhered on a base material.

Even still further objects of the present invention are to provide an electrode plate member and electrode plate with a conductive coating film having excellent durability and solvent resistance and good conductivity and adhered on a collector, and an electricity storage device provided with the electrode plate and having a characteristic such as large discharge capacity or low internal resistance.

Means for Solving the Problem

The above-described objects can be achieved by the present invention to be described hereinafter. Described specifically, the present invention provides the following aqueous liquid compositions and aqueous coating formulations.

[1] An aqueous liquid composition comprising a water-based medium containing water, a polymer having at least one type of groups selected from hydroxyl groups and amino groups, and phosphonobutanetricarboxylic acid, wherein the polymer is at least one polymer selected from the group consisting of a polysaccharide, polyamino acid, polyvinyl alcohol, polyallylamine, polyvinylamine, a polyamidine, a polyethylenimine, and derivatives thereof.

[2] The aqueous liquid composition as described above in [1], further comprising a polyhydric alcohol having a molecular weight of smaller than 190.

[3] The aqueous liquid composition as described above in [2], wherein the polyhydric alcohol is at least one polyhydric alcohol selected from the group consisting of ethylene glycol, diethylene glycol, triethylene glycol, propylene glycol, dipropylene glycol, 2-methyl-1,3-propanediol, 2-amino-2-methyl-1,3-propanediol, 1,2-propanediol, 1,3-propanediol, 1,3-butyleneglycol, 1,2-butanediol, 1,3-butanediol, 1,4-butanediol, isopentanediol, pentylene glycol, hexylene glycol, 1,2-pentanediol, 1,3-pentanediol, 1,4-pentanediol, 1,5-pentanediol, 1,2,3-pentanetriol, 2,3,4-pentanetriol, 1,3,4-pentanetriol, 1,3,5-pentanetriol, 1,2-hexanediol, 1,3-hexanediol, 1,4-hexanediol, 1,5-hexanediol, 1,6-hexanediol, 1,2,3-hexanetriol, 1,3,4-hexanetriol, 1,3,5-hexanetriol, 1,2,6-hexanetriol, 1,4,6-hexanetriol, 2-ethyl-1,3-hexanediol, glycerin, erythritol, pentaerythritol, threitol, arabitol, xylitol, ribitol, galactitol, sorbitol, mannitol, inositol, valienamine, validamine, validatol, trimethylolpropane, triethanolamine, and trihydroxymethylaminomethane.

[4] The aqueous liquid composition as described above in any one of [1]-[3], wherein the polymer (A) and the phosphonobutanetricarboxylic acid (B) are at a mass ratio (A/B) of 1/5 to 5/1.

[5] The aqueous liquid composition as described above in any one of [1]-[4], wherein the polysaccharide is at least one polysaccharide selected from the group consisting of alginic acid, starch, cellulose, chitin, chitosan, pectin, and derivatives thereof.

[6] The aqueous liquid composition as described above in any one of [1]-[4], wherein the polysaccharide is a hydroxyalkylchitosan.

[7] The aqueous liquid composition as described above in [6], wherein the hydroxyalkylchitosan is at least one hydroxyalkylchitosan selected from the group consisting of hydroxyethylchitosan, hydroxypropylchitosan, hydroxybutylchitosan, and dihydroxypropylchitosan.

[8] The aqueous liquid composition as described above in [6] or [7], wherein the hydroxyalkylchitosan is a reaction product of chitosan and an alkylene oxide, and a degree of substitution with the alkylene oxide per mole of pyranose rings constituting the chitosan is at least 0.5 mole.

[9] The aqueous liquid composition as described above in any one of [6]-[8], wherein the phosphonobutanetricarboxylic acid is at a content of 15 to 140 parts by mass per 100 parts by mass of the hydroxyalkylchitosan.

[10] The aqueous liquid composition as described above in any one of [1]-[9], further comprising a polymeric acid, wherein the polymeric acid is at least one of a homopolymer of a carboxyl-containing vinyl monomer and a copolymer of a carboxyl-containing vinyl monomer and a carboxyl-free vinyl monomer.

[11] The aqueous liquid composition as described above in [10], wherein the polymeric acid is at least one polymeric acid selected from the group consisting of polyacrylic acid, polymaleic acid, and polyitaconic acid.

[12] The aqueous liquid composition as described above in any one of [1]-[11], wherein the polyamino acid is at least one polyamino acid selected from the group consisting of polylysine, polyornithine, polyarginine, polyhistidine, protamine, gelatin and collagen.

[13] The aqueous liquid composition as described above in any one of [1]-[12], further comprising at least one of a polyalkylene glycol and a polyalkylene oxide.

[14] The aqueous liquid composition as described above in any one of [1]-[13], wherein the polymer has a weight average molecular weight of 5,000 to 2,000,000.

[15] The aqueous liquid composition as described above in any one of [1]-[14], wherein the polymer and the phosphonobutanetricarboxylic acid are at a total solids concentration of 0.1 to 40 mass %.

[16] An aqueous coating formulation comprising the aqueous liquid composition as described above in any one of [1]-[15].

The present invention also provides the following functional coating film, method for forming a functional coating film, and composite materials.

[17] A functional coating film formed with the aqueous coating formulation as described above in [16].

[18] A method for forming a functional coating film, comprising a step of subjecting, to heat treatment, the aqueous coating formulation as described above in [16].

[19] A composite material comprising a base material and the functional coating film as described above in [17] arranged integrally on the base material.

[20] The composite material as described above in [19], wherein the base material is at least one base material selected from metal, glass, natural resin, synthetic resin, ceramics, wood, paper, fibers, non-woven fabric, woven fabric, and leather.

[21] The composite material as described above in [20], wherein the metal is at least one metal selected from the group consisting of aluminum, copper, nickel, titanium and stainless steel.

The present invention further provides the following undercoating agents, electrode plate members, electrode plate, and electricity storage devices.

[22] An undercoating agent for fabrication of an electrode plate, comprising the aqueous liquid composition as described above in any one of [1]-[15], and a conductive material.

[23] The undercoating agent as described above in [22], wherein the conductive material is at least one conductive material selected from the group consisting of acetylene black, Ketjenblack, graphite, furnace black, monolayer and multilayer carbon nanofibers, and monolayer and multilayer carbon nanotubes.

[24] An electrode plate member comprising a collector, and an undercoat layer arranged on a surface of the collector, said undercoat layer having been formed by subjecting, to heat treatment, the undercoating agent as described above in [22] or [23] applied on the surface of the collector.

[25] The electrode plate member as described above in [24], wherein the undercoat layer has a surface resistivity of not higher than 3,000Ω/□ as measured following JIS K 7194.

[26] An electrode plate comprising the electrode plate member as described above in [24] or [25], and an active material layer arranged on a surface of the undercoat layer constituting the electrode plate member.

[27] An electricity storage device comprising the electrode plate as described above in [26].

[28] The electricity storage device as described above in [27], which is a nonaqueous electrolyte secondary cell, electric double-layer capacitor or lithium ion capacitor.

Advantageous Effects of the Invention

The aqueous liquid composition and aqueous coating formulation according to the present invention contain low-cost materials having low environmental load, and can retain adequate viscosity even when stored over a long term. Further, they can form a functional coating film having excellent adhesiveness to a base material and superb durability, solvent resistance and waterproofness, and are capable of exhibiting functions such as electrical conductivity, hydrophilicity, antifouling properties, antimold and antibacterial activities, anti-odor properties and workability.

Even when a filler such as a conductive material is contained in the aqueous liquid composition and aqueous coating formulation according to the present invention, the filler is dispersed well and hardly undergoes setting-out. In addition, the aqueous liquid composition and aqueous coating formulation according to the present invention are expected to find utility in many fields such as cells, paints of electronic materials, inks, toners, rubbers and plastics, ceramics, magnetic materials, adhesives and liquid crystal color filters.

The functional coating film according to the present invention has excellent adhesiveness to the base material and superb durability, solvent resistance and waterproofness, and is capable of exhibiting functions such as electrical conductivity, hydrophilicity, antifouling properties, anti-mold and antibacterial activities, anti-odor properties and workability. Further, the functional coating film according to the present invention can be provided as a conductive coating film, which is high in the adhesiveness to a collector and electrode layer, is superb in electrolyte resistance, and is improved in the contact resistance with the collector. Furthermore, the electrode plate member and electrode plate according to the present invention are excellent in durability and solvent resistance, and moreover, include the conductive coating film having good conductivity and closely adhered on the collector. The use of the electrode plate member and electrode plate according to the present invention can, therefore, provide a high-performance, electricity storage device, such as a nonaqueous electrolyte secondary cell, electric double-layer capacitor or lithium ion capacitor, having a characteristic such as large discharge capacity or low internal resistance.

BRIEF DESCRIPTION OF THE DRAWING

FIG. 1 is a cross-sectional view schematically illustrating the layer construction of one embodiment of the electrode plate member or electrode plate according to the present invention.

MODES FOR CARRYING OUT THE INVENTION

The present invention will next be described in further detail based on modes for carrying out the invention. The aqueous liquid composition according to the present invention contains a water-based medium containing water, a polymer which has at least one type of groups selected from hydroxyl groups and amino groups and may hereinafter be also referred to as "the OH/NH$_2$ polymer", and phosphonobutanetricarboxylic acid which may hereinafter be also referred to as "PBTC". This OH/NH$_2$ polymer is at least one polymer selected from the group consisting of a polysaccharide, polyamino acid, polyvinyl alcohol, polyallylamine, polyvinylamine, a polyamidine, a polyethylenimine, and derivatives thereof. Owing to the inclusion of these components, the aqueous liquid composition according to the present invention can inhibit the settling-out of a filler such as a conductive material, which may be contained further, and can also assure high hydrophilicity.

Owing to the inclusion of the OH/NH$_2$ polymer and PBTC equipped with binding ability and dispersing ability for a filler such as a conductive material, hydrophilicity and the like, the aqueous liquid composition according to the present invention is also excellent in environmental performance while retaining binding properties and dispersion properties for the filler and functionality such as hydrophilicity. Further, owing to the inclusion of an appropriate amount of water, preferably a water-based medium containing water and an organic solvent such as a water-soluble alcohol as a solvent or dispersion medium, the OH/NH$_2$ polymer and PBTC are prevented from precipitation and adequate viscosity is retained. Hence, the aqueous liquid composition according to the present invention assures a pot life upon coating, prevents the settling-out of the filler, and realizes coatability and dispersion stability.

The term "aqueous liquid composition" as used in the present invention means one containing fine solid particles such as a filler dispersed at a high concentration in a water-based medium and having a slurry form or paste form.

Water-Based Medium

A water-based medium is contained in the aqueous liquid composition according to the present invention. This water-based medium is a component that functions as a solvent or a dispersion medium. The water-based medium can be water alone or a mixed solvent of water and an organic solvent. Water may preferably be distilled water, but depending on the application, may also be ordinary tap water.

The organic solvent may preferably be a solvent that is miscible with water. Specific examples of such an organic solvent include alcohols such as methyl alcohol, ethyl alcohol, n-propyl alcohol, isopropyl alcohol (IPA), n-butyl alcohol, s-butyl alcohol, isobutyl alcohol and t-butyl alcohol; esters such as methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate and butyl lactate; ketones such as acetone, methyl ethyl ketone, methyl isobutyl ketone, diisobutyl ketone and cyclohexanone; amides such as N-methyl-2-pyrrolidone, N,N-dimethylacetamide and N,N-dimethylformamide; and sulfoxides such as dimethyl sulfoxide. Among these, the alcohols are preferred with IPA being more preferred. These organic solvents may be used either singly or as a combination of two or more.

The pH of the water-based medium may preferably be 7 or lower, because the crosslinking of OH/NH$_2$ polymer may hardly proceed in some instances if the pH of the water-based medium is higher than 7.

When a mixed solvent of water and an organic solvent is used as the water-based medium, the proportion of the organic solvent contained in the mixed solvent may be preferably 1 to 70 mass %, with 5 to 60 mass % being more preferred. When a mixed solvent of IPA and water is used, for example, the proportion of IPA contained in the mixed solvent may be preferably 1 to 40 mass %, with 5 to 40 mass % being more preferred.

OH/NH$_2$ Polymer

When heated, the OH/NH$_2$ polymer contained in the aqueous liquid composition according to the present invention reacts with PBTC and undergoes crosslinking. It is, therefore, preferable from the standpoint of reaction efficiency that in a state before heating, the OH/NH$_2$ polymer and PBTC are evenly mixed together. For this purpose, the OH/NH$_2$ polymer may preferably be soluble at 100° C. or lower in water or in a water-based medium containing water and an organic solvent, the pH of which is 1 to 14.

The OH/NH$_2$ polymer is at least one polymer selected from the group consisting of a polysaccharide, polyamino acid, polyvinyl alcohol, polyallylamine, polyvinylamine, a polyamidine, a polyethylenimine, and derivatives thereof.

Specific examples of the above-described derivatives include the carboxylation products, glycolization products, tosylation products, sulfated products, phosphated products, etherified products, alkylated products, hydroxyalkylated (glycerylated) products, salts thereof, and the like. These derivatives can be synthesized by conventionally-known methods. The introduction rate of substituent groups in each polymer may preferably be 0.1 to 6 groups per monomer unit that makes up the polymer. Less than 0.1 group may hardly manifest the characteristics of the substituent groups, while more than 6 groups may result in insufficient cross-linking of the polymer.

Among the above-described specific examples of the OH/NH$_2$ polymer, the polysaccharides are advantageous in that they are natural materials or those derived from natural materials. Of the polysaccharides, alginic acid, starch, cellulose, chitin, chitosan and pectin are preferred for their availability in large quantities. The polysaccharides may be natural materials or synthetic materials. As naturally-occurring polysaccharides, seaweed alginic acid, potato starch, cotton cellulose, crustacean chitosan and the like can be exemplified.

Among such OH/NH$_2$ polymers, preferred are chitin, chitosan, cellulose and derivatives thereof, and more preferred are chitosan, chitosan derivatives, cationized chitosan, and their salts, which may hereinafter also be referred to simply as "chitosans" or "a chitosan". Chitosans are particularly preferred as (i) they by themselves have various unique characteristics such as antibacterial activities, (ii) their crosslinkability with PBTC is good, and (iii) they tend to interact with base materials formed of fibers, metals, glass or the like and have high adhesiveness to the base materials.

Chitosan can be obtained, for example, by deacetylating chitin that exists in the exoskeletons of crustaceans such as crabs, shrimps or lobsters, and is a known material per se. Chitosans of various deacetylation degrees and various molecular weights can be produced, and are readily available from the market.

Among the specific examples of the OH/NH$_2$ polymer, the polysaccharide may preferably be a hydroxyalkylchitosan that is a reaction product of chitosan and an alkylene oxide. This hydroxyalkylchitosan has high solubility in the water-based medium compared, for example, with chitosan and, therefore, can be readily dissolved in the water-based medium even when the content of PBTC is lowered. Specifically, the content of PBTC per 100 parts by mass of the hydroxyalkylchitosan can be set preferably at 15 to 140 parts by mass, more preferably at 20 to 120 parts by mass. Described specifically, the use of such a hydroxyalkylchitosan as the OH/NH$_2$ polymer can lower the content of PBTC and, therefore, can inhibit the resulting aqueous liquid composition (and an aqueous coating formulation using the same) from being excessively lowered in pH. Therefore, the handling of the aqueous liquid composition can be facilitated, and moreover, the risk of corrosion of a coater can be reduced.

When a water-containing IPA solvent is used as the water-based medium, the use of such a hydroxyalkylchitosan as the OH/NH$_2$ polymer also makes it possible to use the water-containing IPA solvent at a high IPA concentration. Described specifically, even when a water-containing IPA solvent the IPA concentration of which is higher than 10 mass % (preferably 15 mass % or higher, more preferably 20 mass % or higher) is used, the hydroxylalkylchitosan can be still dissolved although its dissolution depends on the degree of substitution of the hydroxyalkylchitosan. When a water-containing IPA solvent the IPA concentration of which is high is used as the water-based medium, the resulting aqueous liquid composition (and an aqueous coating formulation using the same) are provided with a lowered surface tension. It is, therefore, possible to provide them with improved dispersibility for a conductive material and also with improved applicability to a collector made of a metal material (for example, an aluminum foil or the like).

Specific examples of the hydroxyalkylchitosan include hydroxyethylchitosan, hydroxypropylchitosan, hydroxybutylchitosan, and dihydroxypropylchitosan. These hydroxyalkylchitosans can be used either singly or as a combination of two or more thereof. In the hydroxyalkylchitosan, the degree of substitution with the alkylene oxide may be preferably 0.5 mole or greater, more preferably 1 to 3 moles per mole of pyranose rings constituting the chitosan. If this degree of substitution is smaller than 0.5 mole, the hydroxyalkylchitosan tends to have insufficient solubility in the water-based medium, thereby possibly making it difficult to form a homogeneous coating film. On the other hand, a degree of substitution in excess of 3 moles may lead to a disadvantage from the standpoint of cost.

As polyvinyl alcohol which may hereinafter also be referred to simply as "PVA", those produced by conventionally-known processes are all usable, and no limitation is imposed on its polymerization degree, saponification degree and the like. Further, copolymerization products with other monomers can also be used. As polyallylamine, polyvinylamine, polyethylenimines and polyamidines, those produced by conventionally-known processes can all be used, and no limitation is imposed on their polymerization degrees and the like. Further, copolymerization products with other monomers can also be used.

The polyamino acid may be a natural material or synthetic material. Specific examples of the polyamino acid include polylysine, polyornithine, polyarginine, polyhistidine, protamine, gelatin, collagen, and the like.

When a polymer having amino groups in its molecule, such as polyvinylamine, a polyamidine, chitosan or a cellulose derivative, is used, improvements can be made in antibacterial activities and water solubility by adding an acid to the polymer and subjecting the acid to a salt-forming reaction with the amino groups. Salts of the polymer can also be used in the present invention.

Any acid can be used in the above-described salt-forming reaction insofar as it dissolves to some extent in the water-based medium. Specific examples include hydrochloric acid; and organic acids such as formic acid, acetic acid, propionic acid, butyric acid, taurine, pyrrolidone carboxylic acid, citric acid, malic acid, lactic acid, hydroxymalonic acid, malonic acid, succinic acid, adipic acid, benzoic acid, salicylic acid, aminobenzoic acid, phthalic acid, and vitamin C. Among these, naturally-occurring organic acids such as lactic acid, malic acid and citric acid are preferred.

The amount of such an acid to be used cannot be definitely specified as it varies depending on the deacetylation degree of chitosan, the basicity of polyvinylamine or a polyamidine, and the equivalent of the acid. It is, however, preferred to use the acid in an amount such that the resulting salt can retain water solubility. The amount of the acid to be used may preferably be in a range of about 0.8 to 2 moles per amino group in polyvinylamine, a polyamidine, chitosan or a cellulose derivative.

The weight average molecular weight of the OH/NH$_2$ polymer may preferably be 5,000 to 2,000,000. A weight average molecular weight of lower than 5,000 tends to result in a brittle crosslinked product. On the other hand, a weight average molecular weight of the OH/NH$_2$ polymer, which is higher than 2,000,000, may make it difficult to form a uniform coating film when the aqueous liquid composition is used as a coating formulation.

When the OH/NH$_2$ polymer is a chitosan, the weight average molecular weight of the chitosan may preferably be 5,000 or higher, with 30,000 to 1,000,000 being more preferred. A weight average molecular weight of lower than 5,000 may provide the resulting film with insufficient strength. Such an excessively low weight average molecular weight may also lead to insufficient dispersion of a conductive material when the conductive material is contained. When the weight average molecular weight of the chitosan exceeds 1,000,000, on the other hand, the resulting aqueous liquid composition may be provided with an excessively high viscosity so that the chitosan has to be limited to a low concentration. Such an unduly high weight average molecular weight is not preferred either, because it may provide the resulting slurry with an increased viscosity, thereby making it difficult to increase the solids concentration of the conductive material.

The content of the OH/NH$_2$ polymer in the aqueous liquid composition according to the present invention may be preferably 0.1 to 40 parts by mass, more preferably 0.5 to 20 parts by mass per 100 parts by mass of the aqueous liquid composition.

PBTC

PBTC is contained in the aqueous liquid composition according to the present invention. PBTC functions as a crosslinking agent for the OH/NH$_2$ polymer. PBTC, therefore, contributes to improvements in the rigidity of the resulting coating film when the aqueous liquid composition according to the present invention is used as a coating formulation. In addition to the function as a crosslinking agent, PBTC also contributes to the expression of hydrophilicity, antibacterial and antimold activities, anti-odor properties and like by the resulting coating film. PBTC is a known substance, and is generally used for applications as a chelating agent, scale inhibitor, detergent, bleach, preservative, disinfectant, dopant and the like. It is to be noted that PBTC is available from the market under a trade name such as "bequest 7000" (product of Thermophos International B.V.).

The content of PBTC in the aqueous liquid composition according to the present invention may be preferably 1 to 40 parts by mass, more preferably 1 to 20 parts by mass per 100 parts by mass of the aqueous liquid composition.

The mass ratio (A/B) of the OH/NH$_2$ polymer (A) to PBTC (B) in the aqueous liquid composition according to the present invention may preferably be 1/5 to 5/1. An A/B value of smaller than 1/5 tends to result in insufficient crosslinking of the OH/NH$_2$ polymer, while an A/B value of greater than 5/1 may lead to a disadvantage in cost performance.

In the aqueous liquid composition according to the present invention, the total solids concentration of the OH/NH$_2$ polymer and PBTC may preferably be 0.1 to 40 mass %. When the weight average molecular weight of the OH/NH$_2$ polymer is high and the solution viscosity is high, it may be required to set the above-described solids concentration at 0.1 mass % or so. A solids concentration of lower than 0.1 mass % may lead to difficulty in stably forming a coating film, while a solids concentration of higher than 40 mass % may lead to difficulty in obtaining a homogeneous aqueous liquid composition.

Polyhydric Alcohol

Preferably, the aqueous liquid composition according to the present invention may further contain a polyhydric alcohol containing two or more hydroxyl groups in the molecule and having a molecular weight of smaller than 190. The use of the aqueous liquid composition, which contains the polyhydric alcohol having the molecular weight of smaller than 190, makes the resulting coating film resistant to delamination from a base material (easier to adhere to the base material), and also imparts still higher flexibility and durability to the resulting coating film. Described specifically, the polyhydric alcohol having the molecular weight of smaller than 190 is presumably a component that functions as a so-called plasticizer. The aqueous liquid composition, which contains the polyhydric alcohol having the molecular weight of smaller than 190, and the aqueous coating formulation using the same are, therefore, especially useful as materials (undercoating agents) for producing electrode plates that constitute electricity storage devices such as nonaqueous electrolyte secondary cells, electric double-layer capacitors and lithium ion capacitors.

Specific examples of the polyhydric alcohol having the molecular weight of smaller than 190 include ethylene glycol, diethylene glycol, triethylene glycol, propylene glycol, dipropylene glycol, 2-methyl-1,3-propanediol, 2-amino-2-methyl-1,3-propanediol, 1,2-propanediol, 1,3-propanediol, 1,3-butyleneglycol, 1,2-butanediol, 1,3-butanediol, 1,4-butanediol, isopentanediol, pentylene glycol, hexylene glycol, 1,2-pentanediol, 1,3-pentanediol, 1,4-pentanediol, 1,5-pentanediol, 1,2,3-pentanetriol, 2,3,4-pentanetriol, 1,3,4-pentanetriol, 1,3,5-pentanetriol, 1,2-hexanediol, 1,3-hexanediol, 1,4-hexanediol, 1,5-hexanediol, 1,6-hexanediol, 1,2,3-hexanetriol, 1,3,4-hexanetriol, 1,3,5-hexanetriol, 1,2,6-hexanetriol, 1,4,6-hexanetriol, 2-ethyl-1,3-hexanediol, glycerin, erythritol, pentaerythritol, theritol, arabitol, xylitol, ribitol, galactitol, sorbitol, mannitol, inositol, valienamine, validamine, validatol, trimethylpropane, triethanolamine, and trihydroxymethylaminomethane. Among these polyhydric alcohols, preferred are ethylene glycol, diethylene glycol, triethylene glycol, propylene glycol, dipropylene glycol, 1,3-propanediol, butanediols, pentanediols, pentanetriols, hexanediols, hexanetriols, glycerin, pentaerythritol, erythritol, xylitol, sorbitol, mannitol, triethanolamine, and trimethylpropane.

The content of the polyhydric alcohol, which is contained in the aqueous liquid composition and has the molecular weight of smaller than 190, may be preferably 100 parts by mass or less, more preferably 80 parts by mass or less per 100 parts by mass of the OH/NH$_2$ polymer. If the content of the polyhydric alcohol having the molecular weight of smaller than 190 exceeds 100 parts by mass per 100 parts by mass of the OH/NH$_2$ polymer, the resulting coating film may be provided with insufficient strength. The lower limit of the polyhydric alcohol contained in the aqueous liquid composition and having the molecular weight of smaller than 190 may be set at 5 parts by mass or higher, although no particular limitation is imposed thereon.

Polymeric Acid

In the aqueous liquid composition according to the present invention, a polymeric acid may preferably be contained further. This polymeric acid is at least one of a homopolymer of a carboxyl-containing vinyl monomer and a copolymer of the carboxyl-containing vinyl monomer and a carboxyl-free vinyl monomer. The inclusion of such a polymeric acid provides the resulting coating film with still higher adhesiveness to the base material and also with still improved hydrophilic function.

The polymeric acid may contain repeating units, which are derived from the carboxyl-containing vinyl monomer, preferably at 20 mole % or higher, and may preferably have a weight average molecular weight of 5,000 or higher. If the content of the repeating units derived from the carboxyl-containing vinyl monomer is lower than 20 mole %, the resulting polymeric acid tends to be provided with lower water solubility, and moreover, the resulting coating film tends to be provided with lower adhesiveness to the base material. If the weight average molecular weight is lower than 5,000, the resulting coating film may be provided with insufficient strength. The upper limit of the content of repeating units derived from the carboxyl-containing vinyl monomer and contained in the polymeric acid may be 100 mole % or lower, although no particular limitation is imposed thereon. Further, the upper limit of the weight average molecular weight of the polymeric acid may be 1,000,000 or lower, although no particular limitation is imposed thereon either.

Specific examples of the carboxyl-containing vinyl monomer include acrylic acid, methacrylic acid, maleic acid, itaconic acid, fumaric acid, crotonic acid, β-carboxyethyl acrylate, β-carboxyethyl methacrylate, and the like.

As the carboxyl-free vinyl monomer, a styrene, acrylate, methacrylate, acrylamide, vinyl alkanoate or acrylonitrile can be used. Specific examples of the styrene include styrene, methylstyrene, vinyltoluene, vinylethylbenzene, vinylnaphthalene, and the like. Specific examples of the acrylate and methacrylate include esters of $C_1$-$C_{30}$ aliphatic alcohols, such as methyl(meth)acrylate, ethyl(meth)acrylate, n-propyl(meth)acrylate and isopropyl(meth)acrylate; esters of alicyclic alcohols, such as cyclohexyl(meth)acrylate, benzyl(meth)acrylate and methyl cyclohexyl(meth)acrylate; hydroxyl-containing (meth)acrylate esters such as hydroxyethyl(meth)acrylate and hydroxypropyl(meth)acrylate; amino-containing (meth)acrylate esters such as dimethylaminoethyl(meth)acrylate and diethylaminoethyl(meth)acrylate; hydroxyethyl(meth)acrylate phthalate; and glycidyl-containing (meth)acrylate esters such as glycidyl(meth)acrylate.

Specific examples of the acrylamide include acrylamide, methacrylamide, diacetone acrylamide, N-methylolacrylamide, N,N-dimethylacrylamide, and the like. Specific examples of the vinyl alkanoate include vinyl acetate, vinyl propionate, vinyl butyrate, vinyl benzoate, and the like. Further, specific examples of the acrylonitrile include acrylonitrile, methacrylonitrile, and the like.

The polymeric acid may preferably be at least one polymeric acid selected from the group consisting of polyacrylic acid, polymaleic acid and polyitaconic acid. Owing to the inclusion of such a polymeric acid, the resulting coating film is provided with still higher adhesiveness to the base material and also with further improved hydrophilic function.

The content of the polymeric acid in the aqueous liquid composition according to the present invention may be preferably 0.1 to 40 parts by mass, more preferably 0.5 to 20 parts by mass per 100 parts by mass of the aqueous liquid composition.

Polyalkylene Glycol, Polyalkylene Oxide

In the aqueous liquid composition according to the present invention, at least one of a polyalkylene glycol and polyalkylene oxide may be contained preferably. The polyalkylene glycol is a nonionic compound available from ring-opening polymerization of an alkylene oxide such as ethylene oxide, propylene oxide or butylene oxide. The polyalkylene oxide, on the other hand, is similar to the polyalkylene glycol, but is a high molecular weight type, nonionic compound having a higher polymerization degree. Owing to the inclusion of at least one of the polyalkylene glycol and polyalkylene oxide, the resulting coating film is provided with still higher flexibility and hydrophilicity.

As the polyalkylene glycol, polyethylene glycol, polypropylene glycol or polybutylene glycol is preferred. As the polyalkylene oxide, on the other hand, polyethylene oxide, polypropylene oxide, polytetramethylene oxide, a random or block copolymer of polyethylene oxide and polypropylene oxide, or the like is preferred. They are available from the market under trade names such as "PEO" (product of Sumitomo Seika Chemicals Co., Ltd.) and "ALKOX" (product of Meisei Chemical Works, Ltd.).

The total content of the polyalkylene glycol and polyalkylene oxide in the aqueous liquid composition according to the present invention may be preferably 0.1 to 40 parts by mass, more preferably 0.5 to 20 parts by mass per 100 parts by mass of the aqueous liquid composition.

Applications of Aqueous Liquid Composition

By selecting and including a suitable $OH/NH_2$ polymer and one or more other components, the aqueous liquid composition according to the present invention can be used as an aqueous coating formulation having low environmental load and excellent functionality. Described specifically, the aqueous liquid composition according to the present invention can be expected to find utility in various fields such as paints, inks, magnetic materials, ceramics, electricity storage devices, adhesives, electronic materials, liquid crystal color filters, pharmaceuticals, cosmetics and fragrances. By including a conductive material such as carbon black, for example, the aqueous liquid composition can be used as a conductive coating formulation for forming a conductive coating film (undercoat layer) on a surface of a collector for an electricity storage device such as a lithium ion secondary cell or capacitor.

Aqueous Coating Formulation

The aqueous coating formulation according to the present invention contains the above-mentioned aqueous liquid composition. It is to be noted that the above-mentioned aqueous liquid composition alone may also be used, as it is, as a coating formulation. As an alternative, the aqueous liquid composition may also be used after diluting it with a water-based medium to have a suitable dilution rate commensurate with the application.

When the aqueous coating formulation according to the present invention is applied onto a surface of a base material such as a metal material and the resulting coating film is heated and dried, PBTC acts as a crosslinking agent for the $OH/NH_2$ polymer to provide the coating film with outstanding adhesiveness to the surface of the base material and also with solvent resistance and waterproofness.

The contents of the respective components in the aqueous coating formulation may be set as will be described below under the assumption that the whole aqueous coating formulation amounts to 100 parts by mass. The $OH/NH_2$ polymer may be preferably 0.1 to 40 parts by mass, more preferably 0.5 to 20 parts by mass. PBTC may be preferably 1 to 40 parts by mass, more preferably 1 to 20 parts by mass. The polymeric acid may be preferably 0.1 to 40 parts by mass, more preferably 0.5 to 20 parts by mass. The total of the polyalkylene glycol and polyalkylene oxide may be preferably 0.1 to 40 parts by mass, more preferably 0.5 to 20 parts by mass. The content of the polyhydric alcohol contained in the aqueous coating formulation may preferably be 100 parts by mass or less, more preferably 80 parts by mass or less per 100 parts by mass of the $OH/NH_2$ polymer. It is to be noted that the solids content of the aqueous coating formulation may preferably be 0.1 to 40 mass %.

If the content of the $OH/NH_2$ polymer is lower than 0.1 parts by mass, the resulting coating film may be provided with insufficient strength and adhesiveness, and the components that make up the coating film tend to fall off. If the content of the $OH/NH_2$ polymer is higher than 40 parts by mass, on the other hand, there is a tendency that a homogeneous solution is hardly obtainable. If the content of PBTC is less than 1 parts by mass, the degree of crosslinking may become insufficient, and therefore, the resulting coating film tends to be provided with low crosslink density and also with insufficient adhesiveness to the base material and insufficient insolubility and non-swellability to organic solvents. If the content of PBTC is higher than 40 parts by mass, on the other hand, the resulting coating film tends to be provided with lower flexibility and may be disadvantageous in cost.

In the aqueous coating formulation, components, such as one or more crosslinking agents other than PBTC (other crosslinking agents), may also be contained. As such other crosslinking agents, polybasic acids other than PBTC can be mentioned. Specifically, usable examples include polybasic acids; acid anhydrides of polybasic acids; salts (ammonium salts and amine salts) of some or all of the carboxyl groups in polybasic acids; alkyl esters, amides, imides and amide-imides of some or all of the carboxyl groups in polybasic acids; derivatives obtained by modifying ones or more of the carboxyl groups in these compounds with N-hydroxysuccinimide, N-hydroxysulfosuccinimide or a derivative thereof; and the like. Preferred as derivatives of polybasic acids are compounds that form the polybasic acids when heated.

More specifically, it is preferred to use the below-described polybasic acids and their derivative (for example, acid anhydrides).

<Dibasic acids> Oxalic acid, malonic acid, succinic acid, methylsuccinic acid, glutaric acid, methylglutaric acid, adipic acid, pimellic acid, suberic acid, azelaic acid, sebacic acid, maleic acid, methylmaleic acid, fumaric acid, methylfumaric acid, itaconic acid, muconic acid, citraconic acid, glutaconic acid, acetylenedicarboxylic acid, tartaric acid, malic acid, spiclisporic acid, glutamic acid, glutathione, aspartic acid, cystine, acetylcysteine, diglycolic acid, iminodiacetic acid, hydroxyethyliminodiacetic acid, thiodiglycolic acid, thionyldiglycolic acid, sulfonyldiglycolic acid, poly(oxyethylene)diglycolic acid (PEG acid), pyridinedicarboxylic acid, pyrazinedicarboxylic acid, epoxysuccinic acid, phthalic acid, isophthalic acid, terephthalic acid, tetrachlorophthalic acid, naphthalene dicarboxylic acid, tetrahydrophthalic acid, methyltetrahydrophthalic acid, cyclohexane dicarboxylic acid, diphenylsulfone dicarboxylic acid, and diphenylmethane dicarboxylic acid;

<Tribasic acids> Citric acid, 1,2,3-propanetricarboxylic acid, 1,2,4-butanetricarboxylic acid, trimellitic acid, and 1,2,4-cyclohexanetricarboxylic acid;

<Tetrabasic acids> Ethylenediaminetetraacetic acid, 1,2,3,4-butanetetracarboxylic acid, pyromellitic acid, 1,2,4,5-cyclohexanetetracarboxylic acid, and 1,4,5,8-naphthalenetetracarboxylic acid; and <Hexabasic acids> 1,2,3,4,5,6-Cyclohexanehexacarboxylic acid.

It is to be noted that other polybasic acids to be described below may also be used in combination. Illustrative are tribasic acids such as isocitric acid, aconitic acid, nitrilotriacetic acid, hydroxyethylethylenediaminetriacetic acid, carboxyethylthiosuccinic acid, and trimesic acid; monocyclic tetracarboxylic acids such as ethylenediamine-N,N'-succinic acid, 1,4,5,8-naphthalenetetracarboxylic acid, pentenetetracarboxylic acid, hexenetetracarboxylic acid, glutamate diacetic acid, maleated methylcyclohexenetetracarboxylic acid, furantetracarboxylic acid, benzophenonetetracarboxylic acid, phthalocyaninetetracarboxylic acid, 1,2,3,4-cyclobutanetetracarboxylic acid, and cyclopentanetetracarboxylic acid; tetrabasic acids, e.g., polycyclic tetracarboxylic acids such as bicyclo[2,2,1]heptane-2,3,5,6-tetracarboxylic acid and bicyclo[2,2,2]octane-2,3,5,6-tetracarboxylic acid; pentabasic acids such as diethylenetriamine pentaacetic acid; and the like.

The content of one or more of such other polybasic acids in the aqueous coating formulation may be set preferably at 0.01 to 200 mass % based on the OH/NH$_2$ polymer.

Examples of the crosslinking agents other than polybasic acids include epoxy compounds such as ethylene glycol diglycidyl ether, polyethylene glycol diglycidyl ether and glycerol polyglycidyl ether; isocyanate compounds such as toluylene diisocyanate, xylylene diisocyanate, hexamethylene diisocyanate and phenyl diisocyanate; blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; aldehyde compounds such as glyoxal, glutaraldehyde, and dialdehyde starch; (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; metal alkoxide compounds such as aluminum trimethoxide, aluminum tributoxide, titanium tetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate); silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; carbodiimide compounds; and the like. The content of one or more of these crosslinking agents may be set preferably at 0.01 to 200 mass % based on the OH/NH$_2$ polymer.

It is also effective to achieve an improvement in the applicability to fiber treatment or the texture of a treated material by including at least one of a nonionic organic compound and a surfactant in the aqueous coating formulation. The total content of the nonionic organic compound and surfactant may be 1 to 50 mass % or so based on the OH/NH$_2$ polymer.

Examples of the nonionic organic compound include glycerin, pentaerythritol, trimethylolpropane, glucose, fructose, mannitol, galactoses, trehalose, and the like.

As surfactants, cationic surfactants, nonionic surfactants and amphoteric surfactants can be mentioned. More specifically, choline chloride, polyoxyethylene dodecylamine, polyoxyethylene octadecylamine, dimethyl dodecyl betaine, alkyldiaminoethylglycine, lanolin fatty acid aminoethyldimethylammonium ethyl sulfate, oxyethylene alkyl ether, alkyl glycosides, alkyl polyglycosides, sucrose fatty acid esters, glycerol alkyl ethers, glycerol alkyl esters, and the like can be mentioned. It is to be noted that two or more of such nonionic organic compounds and surfactants may also be used in combination.

The total content of the nonionic organic compound and surfactant may preferably be 1 to 50 mass % based on the OH/NH$_2$ polymer (for example, a chitosan). The content of the nonionic organic compound may preferably be 1 to 20 mass % based on the OH/NH$_2$ polymer (for example, a chitosan). The content of the surfactant may preferably be 1 to 20 mass % based on the OH/NH$_2$ polymer (for example, a chitosan). The setting of the above-described contents makes an improvement in the balance between the waterproofness and economical effect of the resulting coating film.

In the aqueous coating formulation according to the present invention, a lower monocarboxylic acid as a dissolution aid for the OH/NH$_2$ polymer, a dihydrazide such as adipic acid dihydrazide, a preservative, an antimold agent, an organic solvent, a fine particulate filler, a lubricant, and the like may be added to extent not impairing the objects of the present invention.

The aqueous coating formulation according to the present invention, despite the inclusion of the crosslinking component, hardly thickens or gels even when left over at a temperature of 5 to 30° C. for 1 month or longer. Therefore, the aqueous coating formulation according to the present invention assures a pot life, and can be used as a one-component type treatment. Further, a functional coating film of excellent waterproofness can be formed by heating and drying a coating film which has been formed by applying the aqueous coating formulation according to the present invention onto a surface of an article (base material). It is to be noted that the functional coating film can be formed in strong adhesion to the surface of the article (base material) by conducting the heating and drying to an ultimate temperature of 80° C. or higher, preferably of 120° C. to 200° C.

The aqueous coating formulation according to the present invention can be prepared, for example, by adding the ON/NH$_2$ polymer, PBTC, and one or more other components to the water-based medium and stirring the resulting mixture. No particular limitation is imposed on the order in which the individual components are added to the water-based medium (solvent). Stirring may be conducted at room temperature or, if necessary, may be conducted under heating.

Hydrophilic Coating Film

The aqueous liquid composition and aqueous coating formulation according to the present invention are suited as materials for forming a hydrophilic coating film on a surface of a base material such as glass. By forming the hydrophilic coating film, antifogging properties are imparted. The thickness of the hydrophilic coating film may be generally 0.1 to 10 μm, preferably 0.1 to 5 μm, more preferably 0.1 to 2 μm.

The contact angle (θ) between the hydrophilic coating film and water may preferably be 40° or smaller. The contact angle (θ) between the hydrophilic coating film and water is measured by a method to be described hereinafter. After an aqueous coating formulation is applied onto a base material, the coating formulation is dried at 200° C. for 10 seconds to form a hydrophilic coating film (dry film thickness: 0.7 μm). Following JIS K 2396, the contact angle of water to the hydrophilic coating film is measured by the droplet method. The measurement of the contact angle by the droplet method can be conducted under conditions of 25° C. and 60% relative humidity by using a contact angle meter "DropMaster 100" (manufactured by Kyowa Interface Science Co., Ltd.).

Functional Coating Film

The functional coating film according to the present invention is formed by heating and drying a coating film formed by applying the above-mentioned aqueous coating formulation onto a surface of a material to be coated (base material). No particular limitation is imposed on an amount of coating of the aqueous coating formulation, but the aqueous coating formulation may be applied in such an amount that the functional coating film to be formed will have a thickness of generally from 0.05 to 100 μm, preferably from 0.1 to 10 μm, more preferably 0.1 to 5 μm, still more preferably 0.1 to 2 μm. As the base material, a metal such as aluminum or copper, glass, a natural resin, a synthetic resin, ceramics, wood, paper, fibers, a woven fabric, a nonwoven fabric, a leather or the like can be mentioned. Of these, a collector for an electricity storage device, such as an aluminum foil or copper foil, is preferred.

The aqueous coating formulation is applied onto the surface of the base material by one of various coating methods such as gravure coating, gravure reverse coating, roll coating, Meyer bar coating, blade coating, knife coating, air knife coating, comma coating, slot die coating, slide die coating, dip coating, extrusion coating, spray coating and brush coating. Subsequently, the thus-applied coating formulation is heated and dried to form a functional coating film. If the thickness of the functional coating film is smaller than 0.05 μm, it may be difficult to evenly apply the aqueous coating formulation. A thickness greater than 100 μm, on the other hand, may provide the resulting functional coating film with reduced flexibility.

The drying and heating may be conducted preferably at 80° C. or higher for 1 second or longer, more preferably at 80° C. or higher but 250° C. or lower for 1 second or longer but 60 minutes or shorter. Insofar as these conditions are met, polymers in the coating formulation, such as the OH/NH$_2$ polymer, can be fully crosslinked to provide the resulting functional coating film with improved adhesiveness to the base material and also with improved electrochemical stability. A heat treatment condition of lower than 80° C. or shorter than 1 second may provide the resulting functional coating film with reduced adhesiveness and electrochemical stability.

Composite Material

The composite material according to the present invention is provided with a base material and the above-mentioned functional coating film integrally arranged on the base material. The composite material according to the present invention is a material excellent in hydrophilicity, conductivity, antibacterial activities, anti-odor properties, texture, antifogging properties, paper strength enhancement, dyeability, waterproofness, antifouling properties, and the like. The composite material according to the present invention can be produced by heating and drying a coating film formed by applying the above-mentioned aqueous liquid composition or aqueous coating formulation onto the base material.

As the base material, a metal, glass, a natural resin, a synthetic resin, ceramics, wood, paper, a nonwoven fabric, a woven fabric, a leather or the like can be mentioned. The use of a metal, such as aluminum, copper, nickel, titanium or stainless steel, as a base material can provide a composite material useful as a collector for an electricity storage device.

Undercoating Agent

The undercoating agent according to the present invention contains the above-mentioned aqueous liquid composition and a conductive material, and is useful for the fabrication of an electrode plate. The inclusion of the conductive material makes it possible to form a coating film with improved electrical contact properties. Coating films formed as described above are suited as undercoat layers for electrode plate members to be used in an electricity storage device such as a lithium secondary cell or capacitor. Specifically, undercoat layer having good conductivity can be formed, thereby making it possible to provide the electricity storage device with reduced internal resistance and also with higher capacity density.

The conductive material may preferably be at least one conductive material selected from the group consisting of acetylene black, Ketjenblack, graphite, furnace black, monolayer and multilayer carbon nanofibers, and monolayer and multilayer carbon nanotubes.

The content of the conductive material in the undercoating agent according to the present invention may be preferably 0.1 to 30 parts by mass, more preferably 1 to 20 parts by mass per 100 parts by mass of the undercoating agent. If the content of the conductive material is lower than 0.1 parts by mass, the resulting undercoat layer may be provided with insufficient conductivity. If the content of the conductive material exceeds 30 parts by mass, on the other hand, the other component or components may become insufficient so that the resulting undercoat layer may be provided with lowered performance. It is to be noted that upon formation of an undercoat layer, the undercoating agent may more preferably contain the OH/$NH_2$ polymer at 1 to 10 parts by mass, PBTC at 1 to 10 parts by mass, and the conductive material at 1 to 15 parts by mass when the whole undercoating agent is assumed to amount to 100 parts by mass.

The undercoat agent according to the present invention can be prepared, for example, by adding the ON/$NH_2$ polymer, PBTC, the conductive material, and other components to the water-based medium (dispersion medium), and mixing and dispersing them in a conventionally-known mixer. As the mixer, a ball mill, sand mill, pigment disperser, mix-muller, ultrasonic disperser, homogenizer, planetary mixer, Hobart mixer, or the like can be used. Also preferred is a method that firstly mixes the conductive material in a mixer, adds the OH/$NH_2$ polymer, PBTC, and the other components, and then mixes them until homogeneous. The adoption of such a method makes it possible to readily prepare a homogeneous undercoating agent.

Conductive Coating Film, Electrode Plate Member, Electrode Plate, and Electricity Storage Device The above-mentioned undercoating agent according to the present invention is suited as a material for forming an undercoat layer (conducting coating film) that constitutes an electrode plate for an electricity storage device such as a secondary cell or capacitor. An electrode plate member 14, which is provided with a collector 10 and an undercoat layer 12 arranged on a surface of the collector 10 as illustrated in FIG. 1, can be obtained by heating and drying the undercoating agent applied on the surface of the collector 10. The thickness of the undercoat layer 12 may be generally 0.1 to 10 μm, preferably 0.1 to 5 μm, more preferably 0.1 to 2 μm. By forming, on the thus-formed undercoat layer 12, an active material layer 16 such as a positive electrode layer for a cell, a negative electrode layer for the cell, a positive electrode layer for a capacitor, a negative electrode layer for the capacitor, or a polarizable electrode layer, an electrode plate 20 for an electricity storage device can be fabricated with small resistance between the active material layer 16 and the collector 10 and low environmental load as illustrated in FIG. 1.

Further, the use of electrode plates fabricated as described above makes it possible to obtain an electricity storage device such as a nonaqueous electrolyte secondary cell, electric double-layer capacitor or lithium ion capacitor. This electricity storage device is provided with electrode plate members having undercoat layers arranged on surfaces of collectors, and therefore, has an excellent characteristic such as large discharge capacity or low internal resistance.

The surface resistivity of the undercoat layer may be preferably 3,000Ω/□ or lower, more preferably 2,000Ω/□ or lower. If the surface resistivity is higher than 3,000Ω/□, the internal resistance increases, thereby making it difficult to obtain a high-efficiency and long-life, cell or capacitor. The lower limit of the surface resistivity of the undercoat layer may practically be 10Ω/□ or higher, although no particular limitation is imposed thereon.

The surface resistivity of the undercoat layer is measured by a method to be described hereinafter. After an undercoating agent is applied onto a PET film by using a comma roll coater, the undercoating agent is subjected to drying for 5 minute in an oven controlled at 180° C. to form an undercoat layer having a dry film thickness of 4 μm. Following JIS K 7194, the surface resistivity is measured by the four-point probe method. The measurement of the surface resistivity by the four-point probe method can be conducted under conditions of 25° C. and 60% relative humidity by using a "LORESTA-GP MCP-T610" (manufactured by Mitsubishi Chemical Analytech Co., Ltd.).

EXAMPLES

The present invention will next be described more specifically based on examples. It is to be noted that all designations of "parts" or "%" in the following description are on a mass basis.

Preparation of Various Aqueous Liquid Compositions

The formulas of various aqueous liquid compositions are shown in Tables 1-1, 1-2-1 and 1-2-2. It is to be noted that the following abbreviations will be used: "PBTC" for phosphonobutanetricarboxylic acid, "MeOH" for methyl alcohol, "EtOH" for ethyl alcohol, "IPA" for isopropyl alcohol, "PEG400" for polyethylene glycol having a molecular weight of 400, and "PEG2000" for polyethylene glycol having a molecular weight of 2000.

Sample 1-1

Chitosan (deacetylation degree: 85%, weight average molecular weight: 100,000) (5 parts) and a 50% aqueous solution of PBTC ("Dequest 7000", product of Thermophos International B.V.,) (14 parts) were added to deionized water (81 parts), and the resulting mixture was stirred at room temperature for 4 hours, so that an aqueous liquid composition (100 parts) was prepared.

Samples 1-2 to 1-20

Aqueous liquid compositions were prepared as in Sample 1-1 described above except that the corresponding formulas shown in Table 1-1 were employed.

Sample 1-21

Chitosan (deacetylation degree: 85%, weight average molecular weight: 100,000) (10 parts) and an aqueous solution of a polyacrylic acid ("JURYMERAC-10L", product of Toagosei Co., Ltd.; solids content: 40%, MW: 25,000) (25 parts) were added to deionized water (65 parts), and the resulting mixture was stirred at room temperature for 24 hours. However, chitosan was not dissolved, thereby failing to obtain a homogeneous aqueous liquid composition.

Sample 2-1

Dihydroxypropylchitosan (substitution degree: 0.5, weight average molecular weight: 100,000) (5 parts) and a 50% aqueous solution of PBTC ("Dequest 7000", product of Thermophos International B.V.,) (10 parts) were added to deionized water (85 parts), and the resulting mixture was stirred into a solution at room temperature for 4 hours, so that an aqueous liquid composition (100 parts) was prepared.

Samples 2-2 to 2-37

Aqueous liquid compositions were prepared as in Sample 2-1 described above except that the corresponding formulas shown in Tables 1-2-1 and 1-2-2 were employed.

TABLE 1-1

| | OH/NH₂ polymer | | | PBTC | Polymeric acid | | Polyalkylene glycol (polyalkylene oxide) | | Solvent | |
|---|---|---|---|---|---|---|---|---|---|---|
| | Kind | MW (×10⁴) | Pts | Pts | Kind | Pts | Kind | Pts | Kind | Pts |
| Sample 1-1 | Chitosan | 10 | 5 | 7 | | | | | Water | 88 |
| Sample 1-2 | Chitosan | 20 | 3 | 5 | Polyacrylic acid | 6 | | | Water | 86 |
| Sample 1-3 | Chitosan | 10 | 5 | 5 | Polyacrylic acid | 10 | PEO | 2 | Water | 78 |
| Sample 1-4 | Chitosan | 170 | 0.5 | 2.5 | | | PEO | 2 | Water | 95 |
| Sample 1-5 | Chitosan | 7 | 5 | 5 | Polyacrylic acid | 10 | PEG400 | 5 | Water | 75 |
| Sample 1-6 | Hydroxypropylchitosan | 15 | 7 | 3 | Polyitaconic acid | 3 | | | Water/IPA = 95/5 | 87 |
| Sample 1-7 | Hydroxybutylchitosan | 13 | 5 | 3 | Polymaleic acid | 10 | PPG | 3 | Water | 79 |
| Sample 1-8 | Glycerylated chitosan | 10 | 10 | 3 | Polyacrylic acid | 10 | | | Water | 77 |
| Sample 1-9 | Hydroxyethylcellulose | 13 | 10 | 5 | | | | | Water | 85 |
| Sample 1-10 | Hydroxyethylcellulose | 13 | 5 | 1 | Polyacrylic acid | 4 | | | Water | 90 |
| Sample 1-11 | Hydroxyethylcellulose | 25 | 3 | 1 | Polyacrylic acid | 6 | | | Water | 90 |
| Sample 1-12 | Hydroxypropylcellulose | 10 | 5 | 2 | Polyacrylic acid | 3 | | | Water | 90 |
| Sample 1-13 | Hydroxyethylstarch | 8 | 8 | 10 | | | PEG2000 | 2 | Water | 80 |
| Sample 1-14 | Propylene glycol alginate | 10 | 5 | 3 | Polyacrylic acid | 5 | | | Water | 87 |
| Sample 1-15 | Polyvinyl alcohol | 8 | 10 | 2 | Polyacrylic acid | 10 | | | Water | 78 |
| Sample 1-16 | Polyallylamine | 10 | 10 | 5 | | | PEO | 5 | Water | 80 |
| Sample 1-17 | Polylysine | 0.5 | 10 | 10 | | | PEO | 5 | Water | 75 |
| Sample 1-18 | Succinylated collagen | 11 | 2 | 3 | | | PEO | 1 | Water | 94 |
| Sample 1-19 | Gelatin | 5 | 10 | 5 | | | PPG | 1 | Water | 84 |
| Sample 1-20 | Chitosan oligosaccharide | 0.2 | 10 | 10 | | | | | Water | 80 |
| Sample 1-21 | Chitosan | 10 | 10 | | Polyacrylic acid | 10 | | | Water | 80 |

Polyacrylic acid: "JURYMER AC-10L", product of Toagosei Co., Ltd.,
Polymaleic acid: "Dequest 9000", product of Thermophos International B.V.
Polyitaconic acid: Product of Iwata Chemical Co., Ltd.
PEO: "PEO-1Z", product of Sumitomo Seika Chemicals Co., Ltd.

TABLE 1-2-1

| | Hydroxyalkylchitosan | | | | |
|---|---|---|---|---|---|
| | Kind | Deg. of substitution | Mw (×10⁴) | Pts | PBTC Pts |
| Sample 2-1 | Dihydroxypropylchitosan | 0.5 | 10 | 5 | 5 |
| Sample 2-2 | Dihydroxypropylchitosan | 1.1 | 12 | 5 | 4 |
| Sample 2-3 | Dihydroxypropylchitosan | 1.5 | 14 | 5 | 2.5 |
| Sample 2-4 | Dihydroxypropylchitosan | 2.1 | 20 | 5 | 1 |
| Sample 2-5 | Dihydroxypropylchitosan | 1.2 | 5 | 10 | 5 |
| Sample 2-6 | Dihydroxypropylchitosan | 1.2 | 15 | 5 | 3 |
| Sample 2-7 | Dihydroxypropylchitosan | 1.2 | 50 | 3 | 2 |
| Sample 2-8 | Dihydroxypropylchitosan | 1.1 | 10 | 5 | 6 |
| Sample 2-9 | Hydroxyethylchitosan | 1.1 | 10 | 6 | 4 |
| Sample 2-10 | Hydroxyethylchitosan | 1.1 | 13 | 5 | 2 |
| Sample 2-11 | Hydroxypropylchitosan | 1.5 | 14 | 7 | 5 |
| Sample 2-12 | Hydroxypropylchitosan | 1.5 | 8 | 10 | 5 |
| Sample 2-13 | Hydroxybutylchitosan | 1.1 | 10 | 5 | 2 |
| Sample 2-14 | Hydroxybutylchitosan | 1.4 | 12 | 6 | 4 |
| Sample 2-15 | Dihydroxypropylchitosan | 1.7 | 18 | 5 | 4 |
| Sample 2-16 | Dihydroxypropylchitosan | 1.7 | 18 | 5 | 3 |
| Sample 2-17 | Dihydroxypropylchitosan | 1.7 | 18 | 4 | 4 |
| Sample 2-18 | Dihydroxypropylchitosan | 1.7 | 18 | 5 | 4 |
| Sample 2-19 | Dihydroxypropylchitosan | 1.7 | 18 | 5 | 4 |
| Sample 2-20 | Dihydroxypropylchitosan | 1.7 | 18 | 5 | 4.5 |
| Sample 2-21 | Dihydroxypropylchitosan | 1.7 | 18 | 5 | 3 |
| Sample 2-22 | Dihydroxypropylchitosan | 1.7 | 18 | 5 | 3 |
| Sample 2-23 | Dihydroxypropylchitosan | 1.7 | 18 | 5 | 3 |
| Sample 2-24 | Dihydroxypropylchitosan | 1.7 | 18 | 5 | 3 |
| Sample 2-25 | Dihydroxypropylchitosan | 1.7 | 18 | 5 | 4 |
| Sample 2-26 | Dihydroxypropylchitosan | 1.7 | 18 | 5 | 4 |
| Sample 2-27 | Dihydroxypropylchitosan | 1.7 | 18 | 5 | 4 |
| Sample 2-28 | Dihydroxypropylchitosan | 1.7 | 18 | 5 | 4 |
| Sample 2-29 | Dihydroxypropylchitosan | 1.7 | 18 | 5 | 4 |
| Sample 2-30 | Dihydroxypropylchitosan | 1.7 | 18 | 3 | 4 |
| Sample 2-31 | Dihydroxypropylchitosan | 1.7 | 18 | 5 | 4 |
| Sample 2-32 | Dihydroxypropylchitosan | 1.7 | 18 | 5 | 4 |
| Sample 2-33 | Dihydroxypropylchitosan | 1.7 | 18 | 5 | 4 |
| Sample 2-34 | Dihydroxypropylchitosan | 1.7 | 18 | 5 | 4 |
| Sample 2-35 | Dihydroxypropylchitosan | 1.7 | 18 | 5 | 4 |
| Sample 2-36 | Dihydroxypropylchitosan | 2.1 | 20 | 5 | — |

TABLE 1-2-2

| | Polyhydric alcohol | | Polyalkylene glycol (polyalkylene oxide) | | Solvent | |
|---|---|---|---|---|---|---|
| | Kind | Pts | Kind | Pts | Kind | Pts |
| Sample 2-1 | | | | | Water | 90 |
| Sample 2-2 | | | | | Water/IPA = 90/10 | 91 |
| Sample 2-3 | | | | | Water/IPA = 80/20 | 92.5 |
| Sample 2-4 | | | | | Water/IPA = 70/30 | 94 |
| Sample 2-5 | | | | | Water/IPA = 90/10 | 85 |
| Sample 2-6 | | | | | Water/IPA = 85/15 | 92 |
| Sample 2-7 | | | | | Water/IPA = 95/5 | 95 |
| Sample 2-8 | | | | | Water/IPA = 85/15 | 89 |

TABLE 1-2-2-continued

| | Polyhydric alcohol | | Polyalkylene glycol (polyalkylene oxide) | | Solvent | |
|---|---|---|---|---|---|---|
| | Kind | Pts | Kind | Pts | Kind | Pts |
| Sample 2-9 | | | | | Water/MeOH = 80/20 | 90 |
| Sample 2-10 | | | | | Water/IPA = 80/20 | 93 |
| Sample 2-11 | | | | | Water/EtOH = 70/30 | 88 |
| Sample 2-12 | | | | | Water/IPA = 70/30 | 85 |
| Sample 2-13 | | | | | Water/IPA = 80/20 | 93 |
| Sample 2-14 | | | | | Water/IPA = 50/50 | 90 |
| Sample 2-15 | | | | | Water/IPA = 75/25 | 91 |
| Sample 2-16 | | | | | Water/IPA = 75/25 | 92 |
| Sample 2-17 | Ethylene glycol | 1 | | | Water/IPA = 75/25 | 91 |
| Sample 2-18 | Diethylene glycol | 1 | | | Water/IPA = 75/25 | 90 |
| Sample 2-19 | 1,3-Propanediol | 2 | | | Water/IPA = 75/25 | 89 |
| Sample 2-20 | 1,4-Butanediol | 1.5 | | | Water/IPA = 75/25 | 89 |
| Sample 2-21 | 1,5-Pentanediol | 1 | | | Water/IPA = 75/25 | 91 |
| Sample 2-22 | 1,3,5-Pentanetriol | 1 | | | Water/IPA = 75/25 | 91 |
| Sample 2-23 | 1,6-Hexanediol | 1 | | | Water/IPA = 75/25 | 91 |
| Sample 2-24 | 1,4,6-Hexanetriol | 1 | | | Water/IPA = 75/25 | 91 |
| Sample 2-25 | Glycerin | 1 | | | Water/IPA = 75/25 | 90 |
| Sample 2-26 | Pentaerythritol | 0.5 | | | Water/IPA = 75/25 | 90.5 |
| Sample 2-27 | Erythritol | 0.3 | | | Water/IPA = 75/25 | 90.7 |
| Sample 2-28 | Xylitol | 1 | | | Water/IPA = 75/25 | 90 |
| Sample 2-29 | Sorbitol | 1 | | | Water/IPA = 75/25 | 90 |
| Sample 2-30 | Mannitol | 2 | | | Water/IPA = 75/25 | 91 |
| Sample 2-31 | Triethanolamine | 1 | | | Water/IPA = 75/25 | 90 |
| Sample 2-32 | Trimethylolpropane | 1 | | | Water/IPA = 75/25 | 90 |
| Sample 2-33 | Glycerin | 1 | PEG2000 | 1 | Water/IPA = 75/25 | 89 |
| Sample 2-34 | | | PEG2000 | 1 | Water/IPA = 75/25 | 90 |
| Sample 2-35 | | | PEO | 1 | Water/IPA = 75/25 | 90 |
| Sample 2-36 | | | | | Water/IPA = 80/20 | 95 |
| Sample 2-37 | | | | | Water/IPA = 80/20 | 95 |

Preparation and Evaluation (1) of Undercoating Agents and Undercoat Layers

Example 1

(1-1) Undercoating Agent

Acetylene black (10 parts) and the aqueous liquid composition of Sample 1-1 (90 parts) were combined, and were then stirred and mixed at a rotational speed of 60 rpm for 120 minutes in a planetary mixer to prepare an undercoating agent.

(1-2) Undercoat Layer

The prepared undercoating agent was applied by a comma roll coater onto one side of a collector formed of an aluminum foil (thickness: 20 μm). The thus-coated collector was then heated and dried for 2 minutes in an oven controlled at 110° C., and was further heated and dried for 2 minutes in the oven controlled at 180° C., so that an undercoat layer of 1 μm thickness was formed on the one side of the collector.

(1-3) Solubility/Swellability

A solution with 1 mole of $LiPF_6$ dissolved as a supporting salt in a mixed solvent of EC (ethylene carbonate), PC (propylene carbonate) and DME (dimethoxyethane) combined together at 1:1:2 (volume ratio) was prepared. The conditions of the undercoat layer were observed after it was immersed for 72 hours in the solution controlled at 70° C. The undercoat layer was evaluated "good" in solubility/swellability when no changes were observed. On the other hand, the undercoat layer was evaluated "bad" in solubility/swellability when it was delaminated or swollen. The results are shown in Table 2-1.

(1-4) Surface Resistivity

After the undercoating agent was applied onto a PET film by a comma roll coater, the thus-coated PET film was subjected to drying for 5 minutes in an oven controlled at 180° C. to form an undercoat layer (dry thickness: 4 μm). Following JIS K 7194, the surface resistivity of the resultant undercoat layer was measured by the four-point probe method. The results are shown in Table 2-1. The measurement by the four-point probe method was conducted under the conditions of 25° C. and 60% relative humidity by using a "LORESTA-GP MCP-T610" (manufactured by Mitsubishi Chemical Analytech Co., Ltd.).

Examples 2 to 19, Comparative Examples 1 to 2

Undercoating agents were prepared as in Example 1 described above except that the corresponding aqueous liquid compositions shown in Table 2-1 were used in place of the aqueous liquid composition of Sample 1-1. The evaluation of solubility/swellability and the measurement of surface conductivity were also conducted as in Example 1. The results are shown in Table 2-1. It is to be noted that a 5% solution of polyvinylidene fluoride in NMP (PVDF solution) was used in Comparative Example 2.

TABLE 2-1

| | Aqueous liquid composition | Conductive material Kind | Conductive material Pts | Solubility/ swellability | Surface resistivity ($\Omega/\square$) |
|---|---|---|---|---|---|
| Ex. 1 | Sample 1-1 | AB | 10 | Good | $1.3 \times 10^3$ |
| Ex. 2 | Sample 1-2 | AB | 7 | Good | $1.9 \times 10^3$ |
| Ex. 3 | Sample 1-3 | AB | 10 | Good | $2.1 \times 10^3$ |
| Ex. 4 | Sample 1-4 | AB | 5 | Good | $7.1 \times 10^2$ |
| Ex. 5 | Sample 1-5 | AB | 13 | Good | $1.3 \times 10^3$ |
| Ex. 6 | Sample 1-6 | AB | 15 | Good | $8.9 \times 10^2$ |
| Ex. 7 | Sample 1-7 | AB | 10 | Good | $1.7 \times 10^3$ |
| Ex. 8 | Sample 1-8 | AB | 8 | Good | $2.6 \times 10^3$ |
| Ex. 9 | Sample 1-9 | AB | 10 | Good | $9.8 \times 10^2$ |
| Ex. 10 | Sample 1-10 | AB | 6 | Good | $1.0 \times 10^3$ |
| Ex. 11 | Sample 1-11 | AB | 7 | Good | $9.5 \times 10^2$ |
| Ex. 12 | Sample 1-12 | AB | 6 | Good | $1.1 \times 10^3$ |
| Ex. 13 | Sample 1-13 | AB | 10 | Good | $2.0 \times 10^3$ |
| Ex. 14 | Sample 1-14 | AB | 10 | Good | $1.2 \times 10^3$ |
| Ex. 15 | Sample 1-15 | AB | 10 | Good | $1.8 \times 10^3$ |
| Ex. 16 | Sample 1-16 | KB | 3 | Good | $2.5 \times 10^3$ |
| Ex. 17 | Sample 1-17 | FB | 7 | Good | $2.9 \times 10^3$ |
| Ex. 18 | Sample 1-18 | CNT | 3 | Good | $1.1 \times 10^3$ |
| Ex. 19 | Sample 1-19 | AB | 10 | Good | $1.0 \times 10^3$ |
| Comp. Ex. 1 | Sample 1-20 | AB | 10 | Bad | $1.7 \times 10^3$ |
| Comp. Ex. 2 | PVDF soln. | AB | 5 | Bad | $2.1 \times 10^3$ |

AB: Acetylene black ("DENKA BLACK HS-100", product of Denki Kagaku Kogyo Kabushiki Kaisha)
KB: Ketjenblack ("ECP600JD", product of Lion Corporation)
FB: Furnace black ("#3050B", product of Mitsubishi Chemical Corporation)
CNT: Carbon nanotubes (multilayer type, diameter: 40 to 60 nm, length: 1 to 2 μm, product of Tokyo Chemical Industry Co., Ltd.)

Preparation and Evaluation (2) of Undercoating Agents and Undercoat Layers

Example 20

(2-1) Undercoating Agent

Acetylene black (10 parts) and the aqueous liquid composition of Sample 2-1 (90 parts) were combined, and were then stirred and mixed at a rotational speed of 60 rpm for 120 minutes in a planetary mixer to prepare an undercoating agent. Using a pH meter (manufactured by Horiba, Ltd.), the pH of the resultant undercoating agent was measured. The results are shown in Table 2-2.

(2-2) Undercoat Layer

The prepared undercoating agent was applied by a comma roll coater onto one side of a collector formed of an aluminum foil (thickness: 20 μm). The thus-coated collector was then heated and dried for 2 minutes in an oven controlled at 110° C., and was further heated and dried for 2 minutes in the oven controlled at 180° C., so that an undercoat layer of 1 μm thickness was formed on the one side of the collector.

(2-3) Electrolyte Resistance

An electrolyte with 1 mole of $LiPF_6$ dissolved as a supporting salt in a mixed solvent of EC (ethylene carbonate), PC (propylene carbonate) and DME (dimethoxyethane) combined together at 1:1:2 (volume ratio) was prepared. After the undercoat layer was immersed for 72 hours in the electrolyte controlled at 70° C., the undercoat layer was wiped 10 times at a surface thereof with "Kimwipes" (trade name, product of Nippon Paper Crecia Co., Ltd.). The undercoat layer was evaluated "good" in electrolyte resistance when it was not delaminated by the wiping. On the other hand, the undercoat layer was evaluated "bad" in electrolyte resistance when it was delaminated by the wiping. The results are shown in Table 2-2.

(2-4) Surface Resistivity

After the undercoating agent was applied onto a PET film by a comma roll coater, the thus-coated PET film was subjected to drying for 5 minutes in an oven controlled at 180° C. to form an undercoat layer (dry thickness: 4 μm). Following JIS K 7194, the surface resistivity of the resultant undercoat layer was measured by the four-point probe method. The results are shown in Table 2-2. The measurement by the four-point probe method was conducted under the conditions of 25° C. and 60% relative humidity by using a "LORESTA-GP MCP-T610" (manufactured by Mitsubishi Chemical Analytech Co., Ltd.).

Examples 21 to 54, Comparative Examples 3 to 4

Undercoating agents were prepared as in Example 20 described above except that the corresponding aqueous liquid compositions shown in Table 2-2 were used in place of the aqueous liquid composition of Sample 2-1. The evaluation of electrolyte resistance and the measurement of surface conductivity were also conducted as in Example 20. The results are shown in Table 2-2.

TABLE 2-2

| | Aqueous liquid composition | Conductive material Kind | Conductive material Pts | Electrolyte resistance | Surface resistivity ($\Omega/\square$) | pH of undercoating agent |
|---|---|---|---|---|---|---|
| Ex. 20 | Sample 2-1 | AB | 10 | Good | $9.1 \times 10^2$ | 2.9 |
| Ex. 21 | Sample 2-2 | AB | 7 | Good | $1.0 \times 10^3$ | 2.5 |
| Ex. 22 | Sample 2-3 | AB | 6 | Good | $1.1 \times 10^3$ | 3.7 |
| Ex. 23 | Sample 2-4 | AB | 6 | Good | $8.9 \times 10^2$ | 4.1 |
| Ex. 24 | Sample 2-5 | AB | 5 | Good | $1.9 \times 10^3$ | 3.6 |
| Ex. 25 | Sample 2-6 | AB | 6 | Good | $9.5 \times 10^2$ | 3.3 |
| Ex. 26 | Sample 2-7 | AB | 5 | Good | $1.2 \times 10^3$ | 3.1 |
| Ex. 27 | Sample 2-8 | AB | 5 | Good | $1.7 \times 10^3$ | 2.1 |
| Ex. 28 | Sample 2-9 | AB | 7 | Good | $9.9 \times 10^2$ | 3.1 |
| Ex. 29 | Sample 2-10 | AB | 6 | Good | $1.0 \times 10^3$ | 3.9 |
| Ex. 30 | Sample 2-11 | AB | 5 | Good | $9.7 \times 10^2$ | 2.6 |
| Ex. 31 | Sample 2-12 | KB | 4 | Good | $1.4 \times 10^3$ | 3.5 |
| Ex. 32 | Sample 2-13 | FB | 8 | Good | $1.1 \times 10^3$ | 3.8 |
| Ex. 33 | Sample 2-14 | CNT | 3 | Good | $1.0 \times 10^3$ | 3.2 |
| Ex. 34 | Sample 2-15 | AB | 6 | Good | $1.3 \times 10^3$ | 2.6 |
| Ex. 35 | Sample 2-16 | AB | 6 | Good | $1.1 \times 10^3$ | 3.2 |
| Ex. 36 | Sample 2-17 | AB | 6 | Good | $8.3 \times 10^2$ | 2.2 |
| Ex. 37 | Sample 2-18 | AB | 6 | Good | $8.9 \times 10^2$ | 2.6 |
| Ex. 38 | Sample 2-19 | AB | 6 | Good | $9.6 \times 10^2$ | 2.6 |
| Ex. 39 | Sample 2-20 | AB | 6 | Good | $9.2 \times 10^2$ | 2.4 |
| Ex. 40 | Sample 2-21 | AB | 6 | Good | $8.8 \times 10^2$ | 3.2 |
| Ex. 41 | Sample 2-22 | AB | 6 | Good | $8.5 \times 10^2$ | 3.2 |
| Ex. 42 | Sample 2-23 | AB | 6 | Good | $9.2 \times 10^2$ | 3.2 |
| Ex. 43 | Sample 2-24 | AB | 6 | Good | $9.0 \times 10^2$ | 3.2 |
| Ex. 44 | Sample 2-25 | AB | 6 | Good | $9.1 \times 10^2$ | 2.6 |
| Ex. 45 | Sample 2-26 | AB | 6 | Good | $9.2 \times 10^2$ | 2.6 |
| Ex. 46 | Sample 2-27 | AB | 6 | Good | $9.0 \times 10^2$ | 2.6 |
| Ex. 47 | Sample 2-28 | AB | 6 | Good | $8.9 \times 10^2$ | 2.6 |
| Ex. 48 | Sample 2-29 | AB | 6 | Good | $9.3 \times 10^2$ | 2.6 |
| Ex. 49 | Sample 2-30 | AB | 6 | Good | $8.7 \times 10^2$ | 2.1 |
| Ex. 50 | Sample 2-31 | AB | 6 | Good | $8.8 \times 10^2$ | 2.8 |
| Ex. 51 | Sample 2-32 | AB | 6 | Good | $9.0 \times 10^2$ | 2.6 |
| Ex. 52 | Sample 2-33 | AB | 6 | Good | $9.8 \times 10^2$ | 2.7 |

TABLE 2-2-continued

| | Aqueous liquid composition | Conductive material Kind | Pts | Electrolyte resistance | Surface resistivity ($\Omega/\square$) | pH of undercoating agent |
|---|---|---|---|---|---|---|
| Ex. 53 | Sample 2-34 | AB | 6 | Good | $9.4 \times 10^2$ | 2.6 |
| Ex. 54 | Sample 2-35 | AB | 6 | Good | $9.5 \times 10^2$ | 2.6 |
| Comp. Ex. 3 | Sample 2-36 | AB | 5 | Bad | $1.1 \times 10^3$ | 7.2 |
| Comp. Ex. 4 | Sample 2-37 | AB | 5 | Bad | $1.2 \times 10^3$ | 7.3 |

AB: Acetylene black ("DENKA BLACK HS-100", product of Denki Kagaku Kogyo Kabushiki Kaisha)
KB: Ketjenblack ("ECP600JD", product of Lion Corporation)
FB: Furnace black ("#3050B", product of Mitsubishi Chemical Corporation)

Application to Cells

Example 55

(1) Positive Electrode Plate

The undercoating agent of Example 1 was applied by a comma roll coater onto one side of a collector formed of an aluminum foil (thickness: 20 µm). The thus-coated collector was then heated and dried for 2 minutes in an oven controlled at 110° C., and was further heated and dried for 2 minutes in the oven controlled at 180° C., so that an undercoat layer of 1 µm thickness was formed on the one side of the collector.

A $LiCoO_2$ powder (particle sizes: 1 to 100 µm) (90 parts), acetylene black (5 parts) and a 5% solution of polyvinylidene fluoride in NMP (PVDF solution) (50 parts) were combined, and were then stirred and mixed at a rotational speed of 60 rpm for 120 minutes in a planetary mixer to obtain a slurry-form, positive electrode formulation with the positive-electrode active material contained therein. The thus-obtained, positive electrode formulation was applied onto a surface of the undercoat layer by a comma roll coater, was subjected to drying for 2 minutes in an oven controlled at 110° C., and was dried further for 2 minutes in the oven controlled at 180° C. to eliminate the solvent, so that a positive-electrode active material layer was formed with a dry thickness of 100 µm on the undercoat layer. After pressing was conducted under a condition of 5,000 kgf/cm² to make the film thickness even, aging was conducted for 48 hours in a vacuum oven controlled at 80° C. to fully eliminate volatiles (the water, solvent, etc.) so that a positive electrode plate was obtained.

(2) Negative Electrode Plate

The undercoating agent of Example 1 was applied by a comma roll coater onto one side of a copper-foil collector. The thus-coated copper-foil collector was then heated and dried for 2 minutes in an oven controlled at 110° C., and was further heated and dried for 2 minutes in the oven controlled at 180° C., so that an undercoat layer of 1 µm thickness was formed on the one side of the collector.

By combining a carbon powder (90 parts), which had been obtained by thermally decomposing coal coke at 1,200° C., acetylene black (5 parts) and a 5% solution of polyvinylidene fluoride in NMP (PVDF solution) (50 parts) and stirring and mixing the resultant mixture at a rotational speed of 60 rpm for 120 minutes in a planetary mixer, a slurry-form, negative electrode formulation with the negative-electrode active material contained therein was prepared. The thus-obtained negative electrode formulation was applied onto a surface of the undercoat layer by a comma roll coater, was subjected to drying for 2 minutes in an oven controlled at 110° C., and was dried further for 2 minutes in the oven controlled at 180° C. to eliminate the solvent, so that a negative-electrode active material layer was formed with a dry thickness of 100 µm on the undercoat layer. After pressing was conducted under a condition of 5,000 kgf/cm² to make the film thickness even, aging was conducted for 48 hours in a vacuum oven controlled at 80° C. to fully eliminate volatiles (the water, solvent, etc.) so that a negative electrode plate was obtained.

(3) Cell

An electrode unit was formed by rolling the positive electrode plate and negative electrode plate into a volute form with a separator interposed therebetween. The separator was made of a porous polyolefin (polypropylene, polyethylene or a copolymer thereof) film having a width broader than the positive electrode plate and a three-dimensional porous (spongy) structure. The thus-formed electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at 1:1:2 (volume ratio) to give a total volume of 1 liter.

(4) Charge-Discharge Capacity Retention

The charge-discharge characteristics of cells were measured under a temperature condition of 25° C. by a charge-discharge measuring instrument. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle (hereinafter referred to as "charge-discharge capacity retention") was 99%.

Examples 56 to 78, Comparative Examples 5 to 7

Cells were fabricated as in Example 55 described above except that the corresponding undercoating agents shown in Tables 3-1 and 3-2 were used in place of the undercoating agent of Example 1. Further, they were measured for charge-discharge capacity retention as in Example 55. The results are shown in Tables 3-1 and 3-2.

TABLE 3-1

Positive Electrode Plates, Negative Electrode Plates, and Cells

| | Undercoating agent employed for the production of positive electrode plate | Undercoating agent employed for the production of negative electrode plate | Charge-discharge capacity retention (%) |
|---|---|---|---|
| Ex. 55 | Ex. 1 | Ex. 1 | 99 |
| Ex. 56 | Ex. 2 | Ex. 2 | 99 |

TABLE 3-1-continued

Positive Electrode Plates, Negative Electrode Plates, and Cells

| | Undercoating agent employed for the production of positive electrode plate | Undercoating agent employed for the production of negative electrode plate | Charge-discharge capacity retention (%) |
|---|---|---|---|
| Ex. 57 | Ex. 3 | Ex. 3 | 98 |
| Ex. 58 | Ex. 9 | Ex. 9 | 97 |
| Ex. 59 | Ex. 12 | Ex. 12 | 98 |
| Ex. 60 | Ex. 15 | Ex. 15 | 98 |

TABLE 3-2

Positive Electrode Plates, Negative Electrode Plates, and Cells

| | Undercoating agent employed for the production of positive electrode plate | Undercoating agent employed for the production of negative electrode plate | Charge-discharge capacity retention (%) |
|---|---|---|---|
| Ex. 61 | Ex. 20 | Ex. 20 | 98 |
| Ex. 62 | Ex. 21 | Ex. 21 | 97 |
| Ex. 63 | Ex. 22 | Ex. 22 | 97 |
| Ex. 64 | Ex. 27 | Ex. 27 | 96 |
| Ex. 65 | Ex. 30 | Ex. 30 | 97 |
| Ex. 66 | Ex. 33 | Ex. 33 | 96 |
| Ex. 67 | Ex. 34 | Ex. 34 | 97 |
| Ex. 68 | Ex. 37 | Ex. 37 | 99 |
| Ex. 69 | Ex. 39 | Ex. 39 | 99 |
| Ex. 70 | Ex. 40 | Ex. 40 | 99 |
| Ex. 71 | Ex. 43 | Ex. 43 | 99 |
| Ex. 72 | Ex. 44 | Ex. 44 | 99 |
| Ex. 73 | Ex. 45 | Ex. 45 | 99 |
| Ex. 74 | Ex. 47 | Ex. 47 | 99 |
| Ex. 75 | Ex. 50 | Ex. 50 | 98 |
| Ex. 76 | Ex. 52 | Ex. 52 | 97 |
| Ex. 77 | Ex. 53 | Ex. 53 | 94 |
| Ex. 78 | Ex. 54 | Ex. 54 | 92 |
| Comp. Ex. 6 | Comp. Ex. 3 | Comp. Ex. 3 | 65 |

Application to Capacitors

Example 79

The undercoating agent of Example 1 was applied by a comma roll coater onto one side of a collector formed of an aluminum foil (thickness: 20 μm). The thus-coated collector was then heated and dried for 2 minutes in an oven controlled at 110° C., and was further heated and dried for 2 minutes in the oven controlled at 180° C., so that an undercoat layer of 0.5 μm thickness was formed on the one side of the collector.

A high-purity activated carbon powder (specific surface area: 1,500 m²/g, average particle size: 10 μm) (100 parts) and acetylene black (8 parts) were charged in a planetary mixer, and a 5% solution of polyvinylidene fluoride in NMP (PVDF solution) was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the thus-obtained electrode formulation was applied onto the undercoat layer, followed by drying at 80° C. for 30 minutes in a fan dryer. Using a roll press, pressing was then conducted to obtain a polarizable, capacitor electrode plate having a thickness of 80 μm and a density of 0.6 g/cm³.

From the thus-obtained polarizable, capacitor electrode plate, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was accommodated in a coin-shaped case made of stainless steel (diameter: 20 mm, height: 1.8 mm, stainless steel thickness: 0.25 mm) and equipped with a polypropylene-made packing. An electrolyte was charged into the coin-shaped case such that no air was allowed to remain. A 0.2-mm thick stainless steel cap was put and fixed on the case with the polypropylene-made packing interposed therebetween. The case was then sealed to produce a capacitor of 20 mm in diameter and about 2 mm in thickness. As the electrolyte, a solution with tetraethylammonium tetrafluoroborate dissolved at a concentration of 1 mole/L in propylene carbonate was employed. The measurement results of capacitance and internal resistance of the thus-obtained capacitor are shown in Table 4-1.

Examples 80 to 99

As in Example 79 described above except that the corresponding undercoating agents shown in Tables 4-1 and 4-2 were used in place of the undercoating agent of Example 1, capacitors were obtained. The thus-obtained capacitors were measured for capacitance and internal resistance. The measurement results are shown in Tables 4-1 and 4-2.

Comparative Example 8

As in Example 79 described above except that the corresponding undercoating agent shown Table 4-1 was used in place of the undercoating agent of Example 1, a capacitor was obtained. The capacitance and internal resistance of the thus-obtained capacitor were measured, and were used as references for evaluating the capacitors of Examples 79 to 99.

The capacitors were measured at a current density of 20 mA/cm² for capacitance and internal resistance. Using the capacitance and internal resistance of the capacitor of Comparative Example 8 as references, the capacitors of Examples 79 to 99 were evaluated according to the following standards. The greater the capacitance and the lower the internal resistance, the better the performance as a capacitor.

Evaluation Standards for Capacitance
  A: Capacitance greater by 20% or more than Comparative Example 8.
  B: Capacitance greater by 10% or more but less than 20% than Comparative Example 8.
  C: Capacitance equal to or smaller than Comparative Example 8.

Evaluation Standards for Internal Resistance
  A: Internal resistance lower by 20% or more than Comparative Example 8.
  B: Internal resistance lower by 10% or more but less than 20% than Comparative Example 8.
  C: Internal resistance equal to or higher than Comparative Example 8.

TABLE 4-1

Characteristics of Capacitors

| | Undercoating agent employed for the production of polarizable electrode plate | Capacitance | Internal resistance |
|---|---|---|---|
| Ex. 79 | Ex. 1 | B | B |
| Ex. 80 | Ex. 2 | B | B |
| Ex. 81 | Ex. 5 | B | B |
| Ex. 82 | Ex. 8 | B | A |
| Ex. 83 | Ex. 11 | B | A |
| Ex. 84 | Ex. 15 | B | A |
| Comp. Ex. 8 | Comp. Ex. 2 | — | — |

TABLE 4-2

Characteristics of Capacitors

| | Undercoating agent employed for the production of polarizable electrode plate | Capacitance | Internal resistance |
|---|---|---|---|
| Ex. 85 | Ex. 20 | B | A |
| Ex. 86 | Ex. 21 | B | A |
| Ex. 87 | Ex. 22 | B | B |
| Ex. 88 | Ex. 26 | B | B |
| Ex. 89 | Ex. 30 | B | A |
| Ex. 90 | Ex. 32 | B | B |
| Ex. 91 | Ex. 35 | B | B |
| Ex. 92 | Ex. 37 | B | A |
| Ex. 93 | Ex. 38 | B | A |
| Ex. 94 | Ex. 41 | A | A |
| Ex. 95 | Ex. 42 | A | A |
| Ex. 96 | Ex. 44 | A | A |
| Ex. 97 | Ex. 46 | B | A |
| Ex. 98 | Ex. 48 | A | A |
| Ex. 99 | Ex. 51 | A | A |

Preparation of Hydrophilic Coating Formulations

The formulas of various hydrophilic coating formulations are shown in Table 5. It is to be noted that the following abbreviations will be used: "PBTC" for phosphonobutane-tricarboxylic acid, "BTC" for butanetetracarboxylic acid, "PAA" for polyacrylic acid, "PMA" for polymaleic acid, "PVA" for polyvinyl alcohol, PEG for polyethylene glycol, and "PEO" for polyethylene oxide.

Example 100

Chitosan (deacetylation degree: 85%, weight average molecular weight: 100,000) (5 parts) was dispersed in deionized water (79 parts) to obtain a dispersion. After a 50% aqueous solution of PBTC ("Dequest 7000", product of Thermophos International B.V.,) (16 parts) was added to the thus-obtained dispersion, the resulting mixture was stirred at room temperature for 4 hours, so that a hydrophilic coating formulation (100 parts) was prepared.

Example 101

Chitosan (deacetylation degree: 85%, weight average molecular weight: 60,000) (6 parts) was dispersed in deionized water (64 parts) to obtain a dispersion. After a 50% aqueous solution of PBTC ("Dequest 7000", product of Thermophos International B.V.,) (20 parts) were added to the thus-obtained dispersion, the resulting mixture was stirred at room temperature for 4 hours. An aqueous solution of polyacrylic acid ("JURYMERAC-10L", product of Toagosei Co., Ltd.; solids content: 40%, MW: 25,000) (10 parts) was next added under stirring and the resulting mixture was then stirred at room temperature for 2 hours, so that a hydrophilic coating formulation (100 parts) was prepared.

Examples 102 to 115

Hydrophilic coating formulations were prepared as in Examples 100 and 101 described above except that the corresponding formulas shown in Table 5 were employed.

Comparative Example 9

Deionized water (90 parts) and glycerylated chitosan (10 parts) were combined, and the resulting mixture was stirred into a solution at room temperature for 4 hours to prepare a hydrophilic coating formulation.

Comparative Example 10

After a 10% aqueous solution of PVA ("KURARAY POVAL PVA 117", product of Kuraray Co., Ltd.) (50 parts) was added to deionized water (37.5 parts), an aqueous solution of polyacrylic acid ("JURYMER AC-10L", product of Toagosei Co., Ltd.; solids content: 40%, MW: 25,000) (12.5 parts) was added under stirring. The resulting mixture was stirred at room temperature for 2 hours, so that a hydrophilic coating formulation (100 parts) was prepared.

Comparative Examples 11 and 12

Hydrophilic coating formulations were prepared as in Example 100 described above except that the corresponding formulas shown in Table 5 were employed.

TABLE 5

Formulas of Various Hydrophilic Coating Formulations

| | OH/NH$_2$ polymer | | | PBTC/BTC | | Polymeric acid | | PEG/PEO | | Solvent | |
|---|---|---|---|---|---|---|---|---|---|---|---|
| | Kind | MW (×10$^4$) | Pts | Kind | Pts | Kind | Pts | Kind | Pts | Kind | Pts |
| Ex. 100 | Chitosan | 10 | 5 | — | — | PBTC | 8 | — | — | — | — | Water | 87 |
| Ex. 101 | Chitosan | 6 | 6 | — | — | PBTC | 10 | PAA | 4 | — | — | Water | 80 |
| Ex. 102 | Chitosan | 10 | 5 | — | — | PBTC | 7 | PAA | 8 | PEG | 5 | Water | 75 |
| Ex. 103 | Chitosan | 6 | 5 | PVA | 5 | PBTC | 8 | PAA | 5 | — | — | Water | 77 |
| Ex. 104 | Chitosan | 6 | 5 | PVA | 5 | PBTC | 8 | PAA | 10 | — | — | Water | 72 |
| Ex. 105 | Chitosan | 10 | 2 | PVA | 5 | PBTC | 4 | PAA | 5 | — | — | Water | 84 |

TABLE 5-continued

Formulas of Various Hydrophilic Coating Formulations

| | OH/NH$_2$ polymer | | | | PBTC/BTC | | Polymeric acid | | PEG/PEO | | Solvent | |
|---|---|---|---|---|---|---|---|---|---|---|---|---|
| | Kind | MW (×10$^4$) | Pts | Kind | Pts | Kind | Pts | Kind | Pts | Kind | Pts | Kind | Pts |
| Ex. 106 | Chitosan | 10 | 5 | — | — | PBTC | 8 | — | — | PEO | 5 | Water | 82 |
| Ex. 107 | Chitosan | 10 | 2 | PVA | 5 | PBTC | 3 | PAA | 5 | PEO | 3 | Water | 82 |
| Ex. 108 | Chitosan | 6 | 5 | — | — | PBTC | 5 | PMA | 10 | — | — | Water | 80 |
| Ex. 109 | Glycerylated chitosan | 10 | 10 | — | — | PBTC | 3 | PAA | 10 | — | — | Water | 77 |
| Ex. 110 | Hydroxyethylcellulose | 13 | 5 | — | — | PBTC | 5 | — | — | PEG | 2 | Water/IPA = 9/1 | 88 |
| Ex. 111 | Hydroxyethylstarch | 8 | 8 | — | — | PBTC | 5 | PAA | 5 | — | — | Water | 82 |
| Ex. 112 | — | — | — | PVA | 5 | PBTC | 3 | PAA | 5 | — | — | Water | 87 |
| Ex. 113 | Polyallylamine | 10 | 7 | — | — | PBTC | 5 | — | — | PEO | 3 | Water | 85 |
| Ex. 114 | Polylysine | 0.5 | 10 | PVA | 5 | PBTC | 10 | — | — | — | — | Water | 75 |
| Ex. 115 | Gelatin | 5 | 10 | — | — | PBTC | 5 | — | — | PEO | 2 | Water | 83 |
| Comp. Ex. 9 | Glycerylated chitosan | 10 | 10 | — | — | — | — | — | — | — | — | Water | 90 |
| Comp. Ex. 10 | — | — | — | PVA | 5 | — | — | PAA | 5 | — | — | Water | 90 |
| Comp. Ex. 11 | Chitosan | 10 | 5 | — | — | BTC | 10 | — | — | — | — | Water | 85 |
| Comp. Ex. 12 | Chitosan | 10 | 5 | — | — | BTC | 10 | — | — | PEO | 5 | Water | 80 |

PBTC: "Dequest 7000", product of Thermophos International B.V.
BTC: "RICACID BT-W", product of New Japan Chemical Co., Ltd.
PVA: "KURARAY POVAL PVA 117", product of Kuraray Co., Ltd. (saponification degree: 98.5%, polymerization degree: 1,700)
PAA: "JURYMER AC-10L", product of Toagosei Co., Ltd.

Application to Hydrophilization Treatment of Glass Surfaces (1) Formation of Hydrophilic Coating Films Using a bar coater (No. 3), the hydrophilic coating formulations of Examples 100 to 115 and Comparative Examples 9 to 12 were separately applied onto surfaces of 1-mm thick glass plates (100×100 mm) to give a dry film weight of 1 g/m$^2$. The glass plates with the hydrophilic coating formulations applied thereon were then heated and dried under the conditions shown in Table 6, so that specimens with hydrophilic coating films of about 0.7 μm formed on the glass plates were obtained.

(2) Washing of Specimens

The specimens were washed for 1 hour with running tap water (flow rate: 1 L/minute), and were then dried at 80° C. for 1 hour in flowing air. Using the processing of the washing with running tap water and the drying at 80° C. as 1 cycle, washing was repeated 10 cycles in total.

(3) Measurement of Contact Angle

Purified water (2 μL) was dropped onto each specimen held in a horizontal position. Following JIS K 2396, the contact angle of a water droplet was measured using a contact angle meter ("DropMaster 100", manufactured by Kyowa Interface Science Co., Ltd.). It is to be noted that the measurement of the contact angle was conducted both before washing the specimen and after repeated washing of the specimen over 10 cycles.

(4) Evaluation Standards for Hydrophilicity

From the measured contact angle, the hydrophilicity of the corresponding hydrophilic coating film before and after the washing was evaluated according to the below-described standards. The results are shown in Table 6.
5: Contact angle<10°
4: 10°≤contact angle<20°
3: 20°≤contact angle<30°
2: 30°≤contact angle<40°
1: 40°≤contact angle<50°
0: 50°≤contact angle

TABLE 6

Evaluation Results of Hydrophilicity

| | Heating and drying conditions | | Hydrophilicity | |
|---|---|---|---|---|
| | Drying temp. (° C.) | Time (sec) | Before washing | After washing |
| Ex. 100 | 200 | 60 | 4 | 3 |
| Ex. 101 | 200 | 60 | 4 | 3 |
| Ex. 102 | 200 | 60 | 5 | 4 |
| Ex. 103 | 200 | 60 | 4 | 3 |
| Ex. 104 | 200 | 60 | 4 | 3 |
| Ex. 105 | 200 | 60 | 3 | 3 |
| Ex. 106 | 200 | 60 | 5 | 4 |
| Ex. 107 | 200 | 60 | 5 | 3 |
| Ex. 108 | 200 | 60 | 4 | 3 |
| Ex. 109 | 200 | 60 | 4 | 4 |
| Ex. 110 | 200 | 60 | 5 | 4 |
| Ex. 111 | 200 | 60 | 4 | 3 |
| Ex. 112 | 200 | 60 | 4 | 3 |
| Ex. 113 | 200 | 60 | 5 | 3 |
| Ex. 114 | 200 | 60 | 4 | 3 |
| Ex. 115 | 200 | 60 | 5 | 3 |
| Comp. Ex. 9 | 200 | 60 | 4 | 0 |
| Comp. Ex. 10 | 200 | 60 | 2 | 0 |
| Comp. Ex. 11 | 200 | 60 | 3 | 1 |
| Comp. Ex. 12 | 200 | 60 | 5 | 1 |

INDUSTRIAL APPLICABILITY

The use of the aqueous liquid composition according to the present invention makes it possible to form a functional coating film, which has excellent adhesiveness to a base material and superb durability, solvent resistance and waterproofness and is capable of exhibiting functions such as electrical conductivity, hydrophilicity, antifouling properties, antimold and antibacterial activities, anti-odor properties and workability. A composite material provided with such a functional coating film is useful, for example, as a collector for an electricity storage device.

LEGENDS

10: Collector
12: Undercoat layer
14: Electrode plate member
16: Active material layer
20: Electrode plate

The invention claimed is:
1. An aqueous liquid composition comprising:
a water-based medium containing water;
a polymer having at least one group selected from the group consisting of hydroxyl groups and amino groups;
phosphonobutanetricarboxylic acid; and
polyhydric alcohol having molecular weight of smaller than 190,
wherein the polymer is at least one polymer selected from the group consisting of alginic acid, starch, hydroxyethylecellulose, hydroxypropylcellulose, chitin, chitosan, pectin, polyamino acid, polyvinyl alcohol, polyallylamine, polyvinylamine, polyamidine, polyethylenimine, and derivatives thereof, where the derivatives of the chitosan are hydroxyalkylchitosan and salts thereof, and
the polyhydric alcohol is at least one polyhydric alcohol selected from the group consisting of ethylene glycol, diethylene glycol, triethylene glycol, propylene glycol, dipropylene glycol, 2-methyl-1,3-propanediol, 2-amino-2-methyl-1,3-propanediol, 1,2-propanediol, 1,3-propanediol, 1,3-butyleneglycol, 1,2-butanediol, 1,3-butanediol, 1,4-butanediol, isopentanediol, pentylene glycol, hexylene glycol, 1,2-pentanediol, 1,3-pentanediol, 1,4-pentanediol, 1,5-pentanediol, 1,2,3-pentanetriol, 2,3,4-pentanetriol, 1,3,4-pentanetriol, 1,3,5-pentanetriol, 1,2-hexanediol, 1,3-hexanediol, 1,4-hexanediol, 1,5-hexanediol, 1,6-hexanediol, 1,2,3-hexanetriol, 1,3,4-hexanetriol, 1,3,5-hexanetriol, 1,2,6-hexanetriol, 1,4,6-hexanetriol, 2-ethyl-1,3-hexanediol, erythritol, threitol, arabitol, xylitol, ribitol, galactitol, sorbitol, valienamine, validamine, validatol, triethanolamine, and trihydroxymethylaminomethane.

2. The aqueous liquid composition according to claim 1, wherein a mass ratio (A/B) of the polymer as (A) and the phosphonobutanetricarboxylic acid as (B) is in a range from 1/5 to 5/1.

3. The aqueous liquid composition according to claim 1, wherein the polymer is the hydroxyalkylchitosan or a salt thereof, and
the hydroxyalkylchitosan is at least one hydroxyalkylchitosan selected from the group consisting of hydroxyethylchitosan, hydroxypropylchitosan, hydroxybutylchitosan, and dihydroxypropylchitosan.

4. The aqueous liquid composition according to claim 1, wherein the polymer is the hydroxyalkylchitosan or a salt thereof, and
the hydroxyalkylchitosan is a reaction product of chitosan and alkylene oxide, and
a degree of substitution with the alkylene oxide per mole of pyranose rings constituting the chitosan is at least 0.5 mole.

5. The aqueous liquid composition according to claim 1, wherein the phosphonobutanetricarboxylic acid is included at a content in a range from 15 to 140 parts by mass per 100 parts by mass of the hydroxyalkylchitosan.

6. The aqueous liquid composition according to claim 1, further comprising:
polymeric acid,
wherein the polymeric acid is at least one polymer selected from the group consisting of a homopolymer of a carboxyl-containing vinyl monomer and a copolymer of a carboxyl-containing vinyl monomer and a carboxyl-free vinyl monomer.

7. The aqueous liquid composition according to claim 6, wherein the polymeric acid is at least one polymeric acid selected from the group consisting of polyacrylic acid, polymaleic acid, and polyitaconic acid.

8. The aqueous liquid composition according to claim 1, wherein the polyamino acid is at least one polyamino acid selected from the group consisting of polylysine, polyornithine, polyarginine, polyhistidine, protamine, gelatin and collagen.

9. The aqueous liquid composition according to claim 1, further comprising at least one material selected from the group consisting of a polyalkylene glycol and a polyalkylene oxide.

10. The aqueous liquid composition according to claim 1, wherein
the polymer has weight average molecular weight in a range from 5,000 to 2,000,000.

11. The aqueous liquid composition according to claim 1, wherein a total solid concentration of the polymer and the phosphonobutanetricarboxylic acid is in a range from 0.1 to 40 mass %.

12. An aqueous coating formulation comprising the aqueous liquid composition according to claim 1.

13. A functional coating film formed with the aqueous coating formulation according to claim 12.

14. A composite material comprising a base material and the functional coating film according to claim 13 arranged integrally on the base material.

15. The composite material according to claim 14, wherein the base material is at least one base material selected from the group consisting of metal, glass, natural resin, synthetic resin, ceramics, wood, paper, fibers, non-woven fabric, woven fabric, and leather.

16. The composite material according to claim 15, wherein the metal is at least one metal selected from the group consisting of aluminum, copper, nickel, titanium and stainless steel.

17. A method for forming a functional coating film, comprising a step of subjecting the aqueous coating formulation according to claim 12 to a heat treatment.

18. An undercoating agent for fabrication of an electrode plate, comprising:
the aqueous liquid composition according to claim 1; and
a conductive material.

19. The undercoating agent according to claim 18, wherein the conductive material is at least one conductive material selected from the group consisting of acetylene black, Ketjenblack, graphite, furnace black, monolayer and multilayer carbon nanofibers, and monolayer and multilayer carbon nanotubes.

20. An electrode plate member comprising:
a collector; and
an undercoat layer arranged on a surface of the collector, wherein said undercoat layer has been formed by subjecting the undercoating agent according to claim 18 applied on the surface of the collector to a heat treatment.

21. The electrode plate member according to claim 20, wherein the undercoat layer has a surface resistivity of not higher than 3,000Ω/☐ as measured following JIS K 7194.

22. An electrode plate comprising:
the electrode plate member according to claim 20; and
an active material layer arranged on a surface of the undercoat layer constituting the electrode plate member.

23. An electricity storage device comprising the electrode plate according to claim 22.

24. The electricity storage device according to claim 23, which is a nonaqueous electrolyte secondary cell, an electric double-layer capacitor, or a lithium ion capacitor.

25. The aqueous liquid composition according to claim 1, wherein the composition provides a hydrophilic coating film that maintains hydrophilicity expressed as a contact angle of a water drop in a range of smaller than 30°, after 10 cycles of washing and drying, in each of which the coating film is washed with running tap water for one hour at a flow rate of 1 L/min. and then dried at 80° C. for one hour.

26. The aqueous liquid composition according to claim 1:
wherein the polyhydric alcohol is at least one polyhydric alcohol selected from the group consisting of 2-methyl-1,3-propanediol, 2-amino-2-methyl-1,3-propanediol, 1,3-butyleneglycol, 1,2-butanediol, isopentanediol, pentylene glycol, hexylene glycol, 1,2,3-pentanetriol, 2,3,4-pentanetriol, 1,3,4-pentanetriol, 1,3,5-pentanetriol, 2-ethyl-1,3-hexanediol, erythritol, threitol, arabitol, xylitol, ribitol, galactitol, valienamine, validamine, validatol, triethanolamine, and trihydroxymethylaminomethane.

27. An aqueous liquid composition comprising:
a water-based medium containing water;
a polymer having at least one group selected from the group consisting of hydroxyl groups and amino groups;
phosphonobutanetricarboxylic acid; and
polyhydric alcohol having molecular weight of smaller than 190,
wherein the polymer is at least one polymer selected from the group consisting of the chitosan and the derivatives thereof, and
the polyhydric alcohol is at least one polyhydric alcohol selected from the group consisting of ethylene glycol, diethylene glycol, triethylene glycol, propylene glycol, dipropylene glycol, 2-methyl-1,3-propanediol, 2-amino-2-methyl-1,3-propanediol, 1,2-propanediol, 1,3-propanediol, 1,3-butyleneglycol, 1,2-butanediol, 1,3-butanediol, 1,4-butanediol, isopentanediol, pentylene glycol, hexylene glycol, 1,2-pentanediol, 1,3-pentanediol, 1,4-pentanediol, 1,5-pentanediol, 1,2,3-pentanetriol, 2,3,4-pentanetriol, 1,3,4-pentanetriol, 1,3,5-pentanetriol, 1,2-hexanediol, 1,3-hexanediol, 1,4-hexanediol, 1,5-hexanediol, 1,6-hexanediol, 1,2,3-hexanetriol, 1,3,4-hexanetriol, 1,3,5-hexanetriol, 1,2,6-hexanetriol, 1,4,6-hexanetriol, 2-ethyl-1,3-hexanediol, erythritol, threitol, arabitol, xylitol, ribitol, galactitol, sorbitol, valienamine, validamine, validatol, triethanolamine, and trihydroxymethylaminomethane.

28. The aqueous liquid composition according to claim 27:
wherein the polyhydric alcohol is at least one polyhydric alcohol selected from the group consisting of 2-methyl-1,3-propanediol, 2-amino-2-methyl-1,3-propanediol, 1,3-butyleneglycol, 1,2-butanediol, isopentanediol, pentylene glycol, hexylene glycol, 1,2,3-pentanetriol, 2,3,4-pentanetriol, 1,3,4-pentanetriol, 1,3,5-pentanetriol, 2-ethyl-1,3-hexanediol, erythritol, threitol, arabitol, xylitol, ribitol, galactitol, valienamine, validamine, validatol, triethanolamine, and trihydroxymethylaminomethane.

* * * * *